(12) United States Patent
Li et al.

(10) Patent No.: US 11,891,335 B2
(45) Date of Patent: Feb. 6, 2024

(54) MULTI-FUNCTIONAL CEMENTITIOUS MATERIALS WITH ULTRA-HIGH DAMAGE TOLERANCE AND SELF-SENSING ABILITY

(71) Applicant: The Regents of the University of California, Oakland, CA (US)

(72) Inventors: Mo Li, Irvine, CA (US); Xiaopeng Li, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 84 days.

(21) Appl. No.: 16/294,299

(22) Filed: Mar. 6, 2019

(65) Prior Publication Data
US 2019/0202738 A1  Jul. 4, 2019

Related U.S. Application Data

(63) Continuation-in-part of application No. 16/229,519, filed on Dec. 21, 2018, now abandoned.
(Continued)

(51) Int. Cl.
C04B 28/04 (2006.01)
C04B 14/06 (2006.01)
(Continued)

(52) U.S. Cl.
CPC ............ C04B 28/04 (2013.01); C04B 14/022 (2013.01); C04B 14/06 (2013.01);
(Continued)

(58) Field of Classification Search
CPC ....... C04B 14/06; C04B 28/04; C04B 20/008; C04B 2103/0079; C04B 2103/10;
(Continued)

(56) References Cited

U.S. PATENT DOCUMENTS

| 4,968,561 A * | 11/1990 | Mizobe ............... C04B 16/0641 |
| | | 428/359 |
| 2006/0217464 A1* | 9/2006 | Guevara ................. C04B 16/08 |
| | | 524/2 |

FOREIGN PATENT DOCUMENTS

| CN | 103936347 A * | 7/2014 |
| CN | 103936347 A * | 7/2014 |
| (Continued) |

OTHER PUBLICATIONS

Translation of CN10676001 2017.*
(Continued)

*Primary Examiner* — Shuangyi Abu Ali
(74) *Attorney, Agent, or Firm* — NGUYEN TARBET LLC

(57) ABSTRACT

Cementitious materials having high damage tolerance and self-sensing ability are described herein. These materials may replace conventional concrete to serve as a major material component for infrastructure systems with greatly improved resistance to cracking, reinforcement corrosion, and other common deterioration mechanisms under service conditions, and prevents fracture failure under extreme events. These materials can also be used for the repair, retrofitting or rehabilitation of existing concrete structures or infrastructure systems. Furthermore, these materials may offer capacity for distributed and direct sensing of cracking, straining and deterioration with spatially continuous resolution wherever the material is located, without relying on installation of sensors. The present invention relates to multifunctional cementitious structural or infrastructure materials that integrate self-sensing with damage tolerance for improving safety, extending service life, and health monitoring of structures, components, and infrastructure systems.

3 Claims, 24 Drawing Sheets
(20 of 24 Drawing Sheet(s) Filed in Color)

Related U.S. Application Data

(60) Provisional application No. 62/609,929, filed on Dec. 22, 2017.

(51) Int. Cl.

| | | |
|---|---|---|
| *C04B 18/08* | (2006.01) |
| *C04B 14/02* | (2006.01) |
| *C04B 16/06* | (2006.01) |
| *C04B 18/04* | (2006.01) |
| *C04B 24/26* | (2006.01) |
| *C04B 18/14* | (2006.01) |
| *C04B 111/20* | (2006.01) |
| *C04B 103/32* | (2006.01) |
| *C04B 111/94* | (2006.01) |
| *C04B 111/34* | (2006.01) |

(52) U.S. Cl.
CPC .......... *C04B 16/0641* (2013.01); *C04B 18/08* (2013.01); *C04B 18/146* (2013.01); *C04B 24/2641* (2013.01); *C04B 2103/32* (2013.01); *C04B 2111/2038* (2013.01); *C04B 2111/34* (2013.01); *C04B 2111/94* (2013.01)

(58) Field of Classification Search
CPC . C04B 2103/20; C04B 38/0054; C04B 18/08; C04B 18/146; C04B 20/0048; C04B 24/2647; C04B 14/022; C04B 16/0641; C04B 2103/32; C04B 14/026; C04B 14/30; C04B 14/34; C04B 14/386; C04B 14/4668; C04B 16/0625; C04B 16/0633; C04B 2103/0088; C04B 2111/2038; C04B 2111/34; C04B 2111/94; C04B 24/2641; Y02W 30/91; Y02W 30/09

See application file for complete search history.

(56) References Cited

FOREIGN PATENT DOCUMENTS

| | | | |
|---|---|---|---|
| CN | 104309124 A | | 1/2015 |
| CN | 106760001 A | * | 5/2017 |
| CN | 107081899 A | | 8/2017 |
| WO | WO2018136475 A1 | | 7/2018 |

OTHER PUBLICATIONS

Li, Mo et al. Concrete Materials with Ultra-High Damage Resistance and Self-Sensing Capacity for Extended Nuclear Fuel Storage Systems. 2017. https://www.osti.gov/scitech/biblio/1346143.

Papworths Construction Testing Equipment (PCTE), "Resipod—Resistivity Meter" 2014, 4 Pages.

* cited by examiner

MULTI-FUNCTIONAL CEMENTITIOUS MATERIALS WITH ULTRA-HIGH DAMAGE TOLERANCE AND SELF-SENSING ABILITY

CROSS-REFERENCES TO RELATED APPLICATIONS

This application is a continuation-in-part, and claims benefit of U.S. patent application Ser. No. 16/229,519, filed Dec. 21, 2018, which claims benefit of U.S. Provisional Patent Application No. 62/609,929, filed Dec. 22, 2017, the specification(s) of which is/are incorporated herein in their entirety by reference.

STATEMENT REGARDING FEDERALLY SPONSORED RESEARCH OR DEVELOPMENT

This invention was made with government support under Grant No. DE-AC07-05ID14517, #168284 awarded by the Department of Energy. The government has certain rights in the invention.

BACKGROUND OF THE INVENTION

Field of the Invention

The present invention relates to multifunctional strain-hardening cementitious (MSC) structural materials or infrastructure materials that integrate ultra-high damage tolerance with self-sensing functionality for improving infrastructure or structural safety and durability, extending service life, and monitoring structural health, damage and deterioration with spatially continuous resolution.

Background Art

Concrete is the most heavily consumed man-made material on earth. It is the major material component for transportation, energy, water, and building infrastructure systems. The long-term durability and safety of concrete infrastructure are vital to national prosperity, but are challenged by two fundamental limitations: 1) concrete is quasi-brittle in nature and susceptible to cracking, deterioration and damage under various mechanical and environmental loads; and 2) it is highly difficult to detect cracking, deterioration or damage in concrete or reinforced concrete structural components, especially with spatial resolution, using current structural health monitoring approaches in practice.

Concrete is an inherently quasi-brittle material with low fracture energy (e.g., order of 0.1 kJ/m$^2$); thus, it is highly susceptible to cracking and fracture failure under mechanical and environmental loads. Under service conditions, cracking causes local stress concentration, and compromises concrete transport properties to facilitate chemical attack, moisture and chloride penetration, and reinforcement corrosion. Under extreme events such as earthquakes or impact, the low fracture energy of concrete can result in concrete cracking, spalling and fragmentation, loss of bond with reinforcing steel, and catastrophic structural failure.

Early detection and quantification of strain and cracking in concrete is critical to minimize maintenance costs, prolonging structure service life, ensuring safety and preventing failure. Current management practices mainly rely on regular visual inspections, which can be subjective and limited to accessible locations. For critical structures, health monitoring systems are installed and based on point sensors such as strain gauges, thermocouples and accelerometers. The indirect, point-based sensing approach is costly, requires complex analytical models to correlate the local measurements to structural mechanical state, and is highly difficult to provide spatial information on strain and damage.

Cementitious materials have a porous, heterogeneous microstructure. Under an applied electric field, the dissolved ions in pore water are mobilized to generate current. The material electrical response thus depends on the pore structure and connectivity, the internal porosity and interconnecting layers of calcium silicate hydrate (C-S-H) gel phase, and moisture content. Electrical resistivity of cementitious materials has been explored for monitoring the hydration process and products, assessing pore structure development, and detecting chloride and water penetration. It has also emerged as a sensing method for measuring the material's mechanical state.

The resistivity of cementitious materials has been studied by incorporating carbon and steel fibers, and the effects of fiber size, content and distribution. By exploring DC probing of cementitious pastes with carbon fibers, previous results demonstrated that the material electrical resistance can be correlated with mechanical strain during the elastic stage. Other studies incorporated carbon nanotubes and carbon nanofibers into cementitious matrix to increase electrical conductivity and gauge factors under compression, defined as the ratio of relative change in resistivity to the compressive strain. The effect of fiber aspect ratio was evaluated on the piezoresistive behavior of carbon fiber-reinforced cementitious composites under compression. Instead of using conductive fibers, others modified cement-aggregate interfaces by pre-coating the fine and coarse aggregates with a highly conductive multi-walled carbon nanotube-latex thin film. This method can decrease the required amount of costly carbon nanotubes, compared with dispersing the nanotubes in the cementitious matrix. The majority of the literature focused on reducing the resistivity of cementitious materials to improve their piezoresistive behavior under DC, through adding conductive fibers, nanotubes or coated aggregates. The mechanical behavior of the materials investigated was either quasi-brittle or tension-softening, and the material electromechanical response was mainly explored within elastic stage especially under compression.

Despite these advances, the fundamental linkage between the microstructure and the electromechanical behavior of cementitious materials is not yet well understood. Due to its highly heterogeneous microstructure, a cementitious material cannot be represented by an ideal resistor, and its electrical response is frequency-dependent. Electrical impedance (under AC), including the real and imaginary parts, rather than resistance (under DC), is a more suitable measure for cementitious materials in this invention. AC probing also minimizes the polarizing effect associated with DC probing. The phase lag between the AC current and voltage signals passing through a cementitious material indicates that the material microstructure can be described by an electrical circuit consisting of capacitors, resistors and inductors with distributed circuit elements, rather than a single resistor. These microstructure circuit parameters are tailored in the present invention to achieve a strong, low-noise correlation between impedance (magnitude, real and imaginary parts) and strain in MSCs. The present invention creates MSCs with a damage behavior fundamentally different from the tension-softening cementitious composite materials previously studied. The present invention creates MSCs with strongly-coupled, high signal-to-noise-ratio, and optimized electromechanical response during different stages of the constitutive relation (i.e., the stress vs. strain relation and the complex impedance vs. strain relation).

Other damage detection methods for concrete structures include ultrasonic guided waves and acoustic emission. These methods often require costly instrumentation, intricate network of sensors, and suffer from signal attenuation due to the heterogeneous nature of concrete and data contamination due to background noise and secondary sources. They are significantly more difficult to apply to concrete structures than metallic structures.

To address these challenges, the present invention provides a direct and distributed sensing approach that employs novel multifunctional strain-hardening cementitious materials (MSCs). MSCs are encoded with a distributed microcracking damage process coupled with a self-sensing functionality. The sequential formation of steady-state microcracks enables a prolonged damage process and large tensile ductility, while allowing detection of strain and damage long before localized fracture failure occurs. The advantage of MSC is thus two-fold. First, it provides damage tolerance for improving infrastructure durability under service conditions and safety under extreme events; Second, through electrical probing, MSC offers capacity for distributed sensing wherever the material is located, without relying on installing sensors.

BRIEF SUMMARY OF THE INVENTION

It is an objective of the present invention to provide compositions and methods that allow for a new class of concrete materials, multifunctional strain-hardening cementitious (MSC) materials, that feature extraordinarily high damage tolerance and self-sensing ability, as specified in the independent claims. Embodiments of the invention are given in the dependent claims. Embodiments of the present invention can be freely combined with each other if they are not mutually exclusive.

The present invention features the material design and electromechanical behavior of novel MSCs that integrate tensile ductility with self-sensing functionality. The examples of the present invention provided herein show that the material design was accomplished by tailoring the micro-scale electrical and mechanical parameters to achieve strongly coupled, high-signal-to-noise-ratio electromechanical behavior at the macro-scale. Non-limiting examples of MSC macroscopic tensile stress vs. tensile strain relation and electrical impedance change vs. tensile strain relation, are shown in FIG. 1A, demonstrating the strongly coupled electromechanical behavior of MSC during its elastic, strain-hardening (i.e., multiple microcracking) and tension-softening (i.e., localized fracture) stages. A non-limiting example of multiple microcracking behavior of MSC at a large applied tensile strain=4% during strain-hardening stage is shown in FIG. 1B. The average width of microcracks is approximately 40 μm. These steady-state microcracks are not "real cracks" because they can take increasing loading with self-controlled crack width of around 40 μm during the tensile strain-hardening stage; the increase in applied tensile deformation only increases the number of the microcracks, but not the width of the microcracks. Furthermore, the multiple microcracking behavior of MSC (i.e., the increased number of microcracks due to increased deformation) is coupled with the bulk electrical impedance change in MSC, thus enabling strain as well as damage self-sensing in MSC.

MSCs are encoded with a distributed microcracking damage process coupled with damage self-sensing capacity. The sequential formation of steady-state microcracks during material strain-hardening stage leads to a prolonged damage process, while allowing detection of microcracking damage level in the material long before localized fracture failure occurs. Through electrical probing and tomography method, distributed strain and damage sensing in structural components made of MSCs can be achieved.

Four-point AC electrical impedance spectroscopy (EIS) and equivalent circuit (FIG. 3A) were conducted to understand the effects of carbon black (CB) nanoparticles on the electrical microstructure of the cementitious matrix, and the interfaces between nonconductive polyvinyl alcohol (PVA) fibers and the cementitious matrix. The impact of CB nanoparticles on the cementitious microstructure circuit parameters was obtained (FIGS. 4A-4D). In addition, the results from the combination of uniaxial tension, fracture toughness and single crack opening tests, revealed the negative impact of CB nanoparticles on the material tensile strength and ductility (FIGS. 5-6, 7A-7D). Based on the findings, material tailoring strategies were developed to improve material mechanical behavior (shown as the redesigns in FIGS. 6-8). The present invention features a new class of MSCs with electromechanical response enabling self-sensing capacity during elastic, strain-hardening and tension-softening stages under monotonic and cyclic loading.

The novel concrete materials of the present invention may replace conventional concrete to serve as a major material component for infrastructure or structural systems with greatly improved resistance to cracking, reinforcement corrosion, and other common deterioration mechanisms under service conditions, and prevents fracture failure under extreme events (e.g. natural and man-made hazards). The novel concrete materials can also be used for the repair, retrofitting or rehabilitation of existing concrete structures or infrastructure systems.

The MSCs of the present invention may offer capacity for distributed and direct sensing of cracking and straining wherever the material is located, with spatially continuous resolution, without relying on the installation of sensors. Using electrical probing and tomography methods, multi-dimensional spatial mapping can be achieved offering a visual depiction of concrete damage and deterioration.

The present invention features a multifunctional cementitious material that comprises water, cement, aggregates, pozzolanic ingredients, conductive particulates, chemical admixtures (e.g., superplasticizer, accelerator, retarder, viscosity modifying agent, or combination thereof), and short discontinuous reinforcing fibers. The combination of the ingredients, through proper processing and curing, enables formation of a multi-scale structure, comprising a network of micro- to nano-sized pores, aggregates/matrix interfaces, and fiber/matrix interfaces in the cementitious composite material that exhibits a cracking behavior capable of dissipating energy through steady-state crack propagation and multiple microcracking with self-controlled crack widths of about 1 μm to 300 μm such that the cementitious material is highly tolerant to damage. The multi-scale network of partially conductive, conductive and nonconductive paths in the cementitious material also enable the material to behave as an electrical self-sensor for measurement and monitoring of its mechanical state such as strain and damage.

In some embodiments, the material is cement-based and contains a small amount of polymeric fibers and carbon-based nanomaterials (or other conductive nanoparticulates). The material design is achieved by integrating ingredient selection, rheology control during processing, and nano- and microstructure tailoring for a desired macroscopic electromechanical behavior. The cracking behavior of the nanomaterial-modified cementitious matrix, and the nanomaterial/fiber/matrix interfaces are engineered to dissipate energy through steady-state crack propagation and multiple microcracking at macroscopic scale. The electrical nanostructure and microstructure are engineered to exhibited strong piezoresistive behavior with high signal-to-noise ratio during elastic straining. Furthermore, the electrical properties of the cementitious matrix, the nonconductive polymeric fibers, and the fiber/matrix interfaces are tailored to achieve a macroscopic material electromechanical response, which allows self-sensing of strain and cracking damage well beyond elastic stage, i.e., the inelastic stage such as the strain-hardening stage and the tension-softening state where damage occurs and progresses.

Compared to conventional concrete materials, the cementitious materials of the present invention, e.g., MSC, have higher mechanical toughness and tensile ductility, higher damage tolerance, higher energy-dissipation capacity, longer-term durability, safer, less energy consumption during structural life cycle, and can self-sense its own damage and mechanical states with spatially continuous resolution at higher accuracy without relying on the installation of sensors. In some embodiments, the cementitious materials of the present invention may be used in civilian structures such as buildings, bridges, road pavements, parking structures, tunnels, pillars, foundations, and the like. In addition to civil infrastructure, this technology may be applied to army structures and energy infrastructure such as pipelines, dams, nuclear power plants, spent nuclear fuel storage pool and dry casks, wind turbines towers and foundations, wave energy devices, defense protective structures, or to any structure where structural deterioration and safety are always concerns.

The macroscale tensile stress-strain relation of examples of MSC is shown in FIGS. 1 and 8. Compared with normal fiber reinforced concrete (FRC), MSC features a tensile strain-hardening behavior and large tensile ductility after the initial elastic stage. During its strain-hardening stage, tensile stress increases with tensile strain in MSC, leading to incredible tensile ductility hundreds of times larger than normal FRC. Such tensile ductility indicates large fracture energy, and is thus crucial for achieving ultra-high damage tolerance to extend service life and improving safety of structures and infrastructure systems. In addition, the sequential formation of steady-state microcracks during material strain-hardening stage leads to a prolonged damage process, uniquely allowing detection of microcracking damage level in the material long before localized fracture failure occurs.

One of the unique and inventive technical features of the present invention is the range of the proportions of the components making up the cementitious composite material. Another inventive feature of the present invention is the method by which the nano-scale and micro-scale components are combined in order to produce a well-mixed composite material. Without wishing to limit the invention to any theory or mechanism, these technical features of the present invention advantageously provide a critical multi-scale structure in the material. As opposed to the continuing localization and opening of a large crack when conventional concrete is damaged, this multi-scale structure enables the controlled sequential formation and steady-state propagation of multiple microcracks when the material, which contains conductive particulates (e.g., nano-sized carbon-based ingredients), is damaged. Meanwhile, the multi-scale structure can increase the impedance signal-to-noise (SNR) ratio when measuring an electrical signal from the material, and enables a strong correlation between material electrical response under AC (e.g., complex impedance, resistance, capacitance, phase angle, etc.) under a wide range of probing frequencies, and mechanical state (e.g., strain, cracking, damage, etc.) at elastic and inelastic stages, thus providing a self-sensing functionality as well as damage tolerance to the material. None of the presently known prior references or work has the unique inventive combined these technical features of the present invention.

The range of the components' proportions was surprisingly found to be critical in forming the multi-scale structure that simultaneously imparted high damage-tolerance and self-sensing properties in the cementitious material. For example, experimental work that produced materials having proportions that deviated from the critical range (Table 1) affected the electrical impedance and its frequency dependency, SNR ratio, and gage factors. In addition, these deviations adversely affected the multi-scale structure of the material, for instance, causing a deterioration of tensile strain capacity, which leads to a tension-softening behavior.

Further still, the method of producing the cementitious material with a uniform dispersion of fiber and conductive particulates (e.g., carbon-based nanomaterials) was surprisingly found to be critical in forming the multi-scale structure. For example, experimental work that produced materials with non-uniform fiber dispersion resulted in large-spaced crack formation with wider cracking, a decrease or even loss in tensile ductility. Further still, experimental work that produced materials with non-uniform dispersion of conductive particulates (e.g., carbon-based nanomaterials) resulted in a highly heterogeneous electrical microstructure and low SNR ratio.

The MSC's pseudo-strain-hardening response achieved by the multiple microcracking process offers high damage tolerance, and is also crucial for self-sensing: First, the strain-hardening response corresponds to a largely extended damage process (inelastic stage), which provides damage tolerance while allowing detection of microcrack damage long before unstable localized fracture occurs, so that early warning is possible. Second, the strain-hardening stage also offers a larger electrical impedance change with mechanical strain change and sensing sensitivity, which cannot be achieved by other self-sensing concrete with tension-softening behavior (as shown in FIG. 1). Third, the strain-hardening stage and tension-softening stage allow strong coupling of electrical impedance with damage level in the material; the damage level refers to the increasing number of microcracks during the strain-hardening stage, and the localized crack opening and fracture at the final failure crack during the tension-softening stage.

Two types of other self-sensing concrete exist. One resembles normal concrete. Compared with this type of self-sensing concrete, MSC offers significantly larger damage tolerance, (FIG. 1A), and self-sensing capacity beyond elastic stage (e.g. inelastic and post-cracking stages). The other resembles FRC with a tension-softening behavior. Compared with this FRC type, MSC offers a largely extended damage process (inelastic stage) before failure, which provides damage tolerance while allowing detection of microcrack damage long before unstable localized fracture occurs, so that early warning can be achieved.

Importantly, the fiber/matrix interfacial bond was strategically tailored at nano-scale so that it can dissipate tremendous energy under loading, while the pullout behavior is controlled to ensure multiple microcracking behavior and a minimum crack width during multiple microcracking. In addition, the electrical microstructure was strategically tailored to have an optimum combination of partially conductive, conductive, and nonconductive paths, so that the material exhibited a strongly coupled, high signal-to-noise ratio electromechanical response under AC probing with high self-sensing sensitivity.

The current invention can be used either as traditional concrete-based sensor or as structural component. A series of electrical signal measurements can be performed on the target sample or structure made from MSC. Then image reconstructions can be performed by solving an inverse problem based on electrical signal measurements to detect the damage and strain in the target (FIG. 3B). The novel concrete materials of the present invention may replace conventional concrete to serve as a major material component for infrastructure systems with greatly improved resistance to cracking, reinforcement corrosion, and other common deterioration mechanisms under service conditions, and prevents fracture failure under extreme events (e.g. natural and man-made hazards). The novel concrete materials can also be used for the repair, retrofitting or rehabilitation of existing concrete structures or infrastructure systems.

The MSCs of the present invention may offer capacity for distributed and direct sensing of cracking and straining wherever the material is located, without relying on the installation of sensors. Using electrical probing and tomography methods, multi-dimensional spatial mapping offering a visual depiction of concrete damage and deterioration can be achieved.

The present invention features a multi-functional cementitious material that comprises water, cement, aggregates (e.g., sand, ground or fine quartz), pozzolanic ingredients, conductive particulates, superplasticizer, accelerator, retarder, viscosity modifying agent (or combination thereof), and discontinuous reinforcing fibers. The combination of the ingredients enable formation of a multi-scale structure, comprising a network of micro- to nano-sized pores, aggregates/matrix interfaces, and fiber/matrix interfaces in the cementitious composite material that exhibits a cracking behavior capable of dissipating energy through steady-state crack propagation and multiple microcracking with self-controlled crack widths of about 1 μm to 300 μm such that the cementitious material is highly tolerant to damage. The multi-scale network of partially conductive, conductive and nonconductive paths in the cementitious material also enable the material to behave as an electrical self-sensor for measurement and monitoring of its mechanical state.

In some embodiments, the material is cement-based and contains a small amount of polymeric fibers and carbon-based nanomaterials (or other conductive particulates). The material design is achieved by integrating ingredient selection, rheology control during processing, and nano- and microstructure tailoring for a desired macroscopic electromechanical behavior. cracking behavior of the nanomaterial-modified cementitious matrix, and the nanomaterial/fiber/matrix interfaces are engineered to dissipate energy through steady-state crack propagation and multiple microcracking at macroscopic scale. The electrical nanostructure and microstructure are engineered to exhibited strong piezoresistive behavior with high signal-to-noise ratio during elastic straining. In addition, the electrical properties of the cementitious matrix, the nonconductive polymeric fibers, and the fiber/matrix interfaces are tailored to achieve a macroscopic material electromechanical response, which allows self-sensing of strain and cracking damage beyond elastic stage, i.e., the strain-hardening stage and the tension-softening stage where damage occurs and progresses.

The non-limiting examples of macroscale tensile stress-strain relation of MSC are shown in FIGS. 1 and 8. Compared with normal fiber reinforced concrete (FRC), MSC features a tensile strain-hardening behavior and large tensile ductility after the initial elastic stage. During its strain-hardening stage, tensile stress increases with tensile strain in MSC, leading to incredible tensile ductility hundreds of times larger than normal FRC. Such tensile ductility indicates large fracture energy, and is thus crucial for achieving ultra-high damage tolerance to extend service life and improving safety of structures and infrastructure systems. In addition, the sequential formation of steady-state microcracks during material strain-hardening stage leads to a prolonged damage process, uniquely allowing detection of microcracking damage level in the material long before localized fracture failure occurs.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIGS. 1A-1B show non-limiting examples of tensile behavior of multifunctional strain-hardening cementitious (or "concrete") materials (MSC) of the present invention. FIG. 1A shows the tensile stress-strain relation of the MSC. FIG. 1A also shows MSC strain sensing during elastic, strain-hardening (multiple microcracking damage) and tension-softening (localized fracture failure) stages. FIG. 1B shows distributed multiple microcracking with controlled crack width (rather than localized fracture) that leads to ultra-high damage tolerance.

FIG. 2A shows strain sensing under cyclic tension during the elastic stage. FIG. 2B shows strain sensing under cyclic compression during the elastic stage. FIG. 2C shows strain sensing under cyclic tension with increasing peak strain from 0.1% to 0.3% and 0.5%.

FIG. 3A shows a non-limiting example of Electrical Impedance Spectroscopy (EIS) measurement and equivalent circuit modeling on an MSC structural component. FIG. 3B shows a non-limiting example of Electrical Impedance Tomography (EIT) and image reconstruction of real damage in the structural component.

FIGS. 4A-4D show the effects of carbon black nanoparticles on equivalent circuit model parameters. FIG. 4A shows resistance $R_1$. FIG. 4B shows resistance $R_2$. FIG. 4C shows capacitance $C_2$. FIG. 4D shows capacitance $C_1$.

FIGS. 5A-5D show the effect of carbon black nanoparticles on tensile-strain relation of an initial design (not the final MSC design). FIG. 5A shows effect of 0% carbon black nanoparticles on tensile-strain relation of an initial design (not the final MSC design). FIG. 5B shows the effect of 2.5% carbon black nanoparticles on tensile-strain relation of an initial design (not the final MSC design). FIG. 5C shows the effect of 5% carbon black nanoparticles on tensile-strain relation of an initial design (not the final MSC design). FIG. 5D shows the effect of 10% carbon black nanoparticles on tensile-strain relation of an initial design (not the final MSC design).

FIG. 6 shows the effect of carbon black nanoparticle content on cementitious matrix fracture toughness.

FIGS. 7A-7D show fiber bridging cohesive stress vs. crack opening (σ~δ) relation. FIG. 7A shows the effect of 0%, 2.5%, 5%, and 10% carbon black nanoparticle content on the σ~δ relation. FIG. 7B shows the σ~δ relations of SHC-2.5% CB (initial design) and MSC-2.5% CB (redesign). FIG. 7C shows the σ~δ relations of SHC-5% CB (initial design) and MSC-5% CB (redesign). FIG. 7D shows the σ~δ relations of SHC-10% CB (initial design) and MSC-10% CB (redesign).

FIGS. 8A-8D show non-limiting examples of tensile stress-strain relation of MSCs with various compositions. FIG. 8A shows the tensile stress-strain relation of SHC-0% CB with 0% carbon black nanoparticle content. FIG. 8B shows the tensile stress-strain relation of MSC-2.5% CB with 2.5% carbon black nanoparticle content. FIG. 8C shows the tensile stress-strain relation of MSC-5% CB with 5% carbon black nanoparticle content. FIG. 8D shows the tensile stress-strain relation of MSC-10% CB with 10% carbon black nanoparticle content.

Figure 13C:
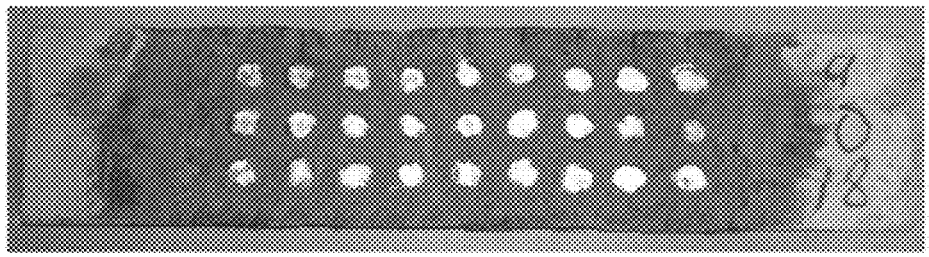
Figure 13B:
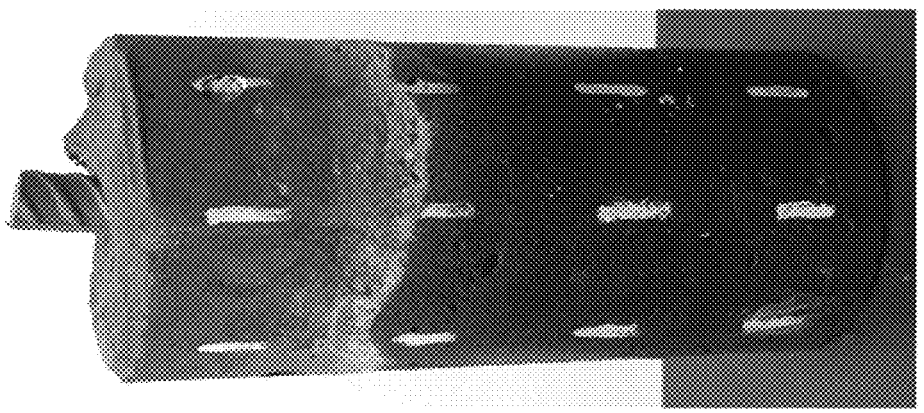
Figure 13A:
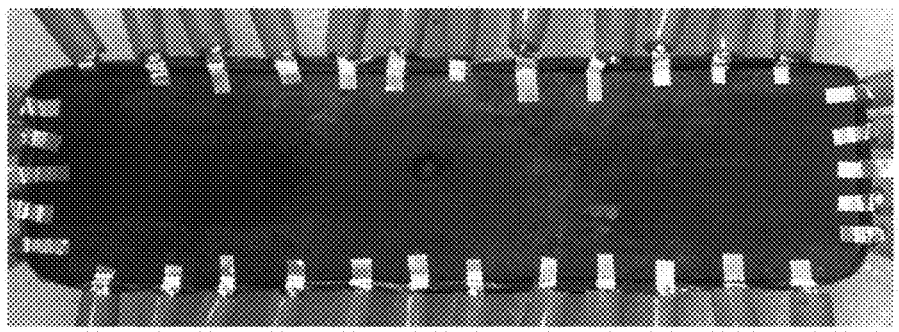

FIGS. 13A-13C are non-limiting embodiments of the present invention. FIG. 13A shows an MSC plate. FIG. 13B shows a steel reinforced MSC cylinder. FIG. 13C shows an MSC beam.

Figure 14:
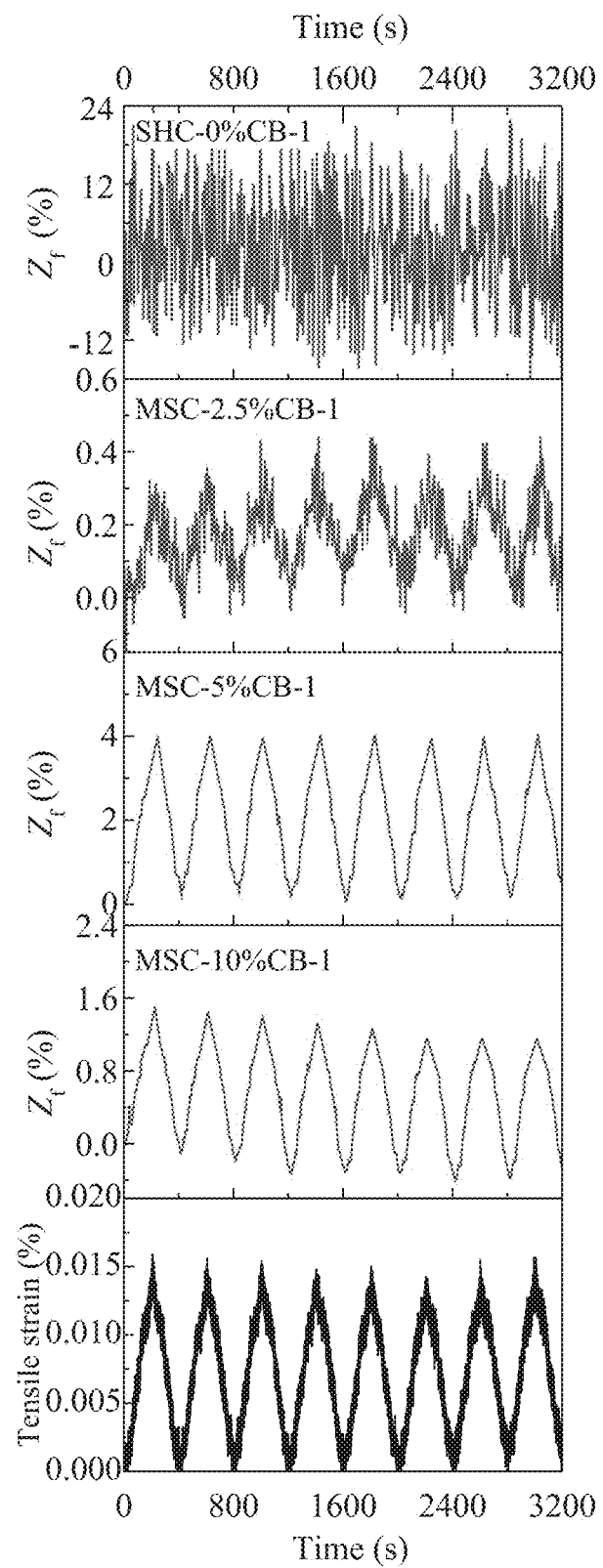

FIG. 14 shows the non-limiting examples of electromechanical behavior of SHC-0% CB, MSC-2.5% CB MSC-5% CB, and MSC-10% CB during elastic stage under cyclic uniaxial tension. One representative specimen is shown for each mix design.

Figure 15:
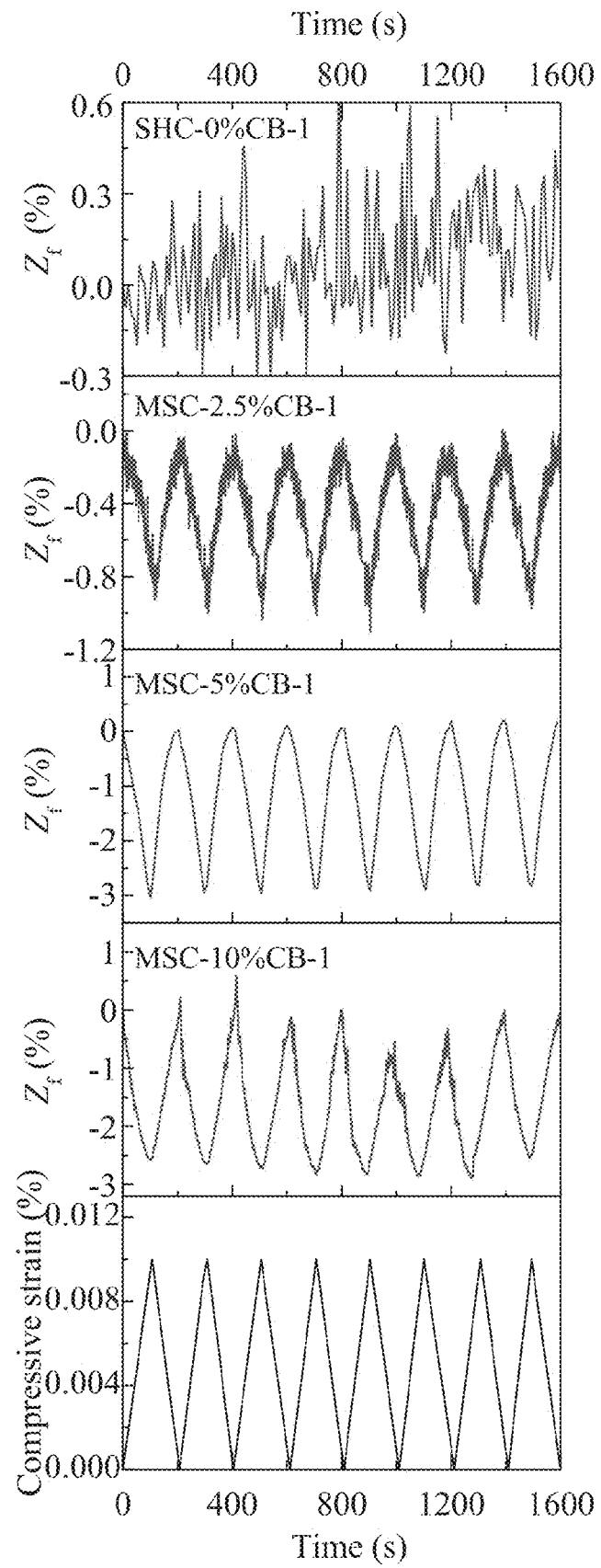

FIG. 15 shows the non-limiting examples of electromechanical behavior of SHC-0% CB, MSC-2.5% CB, MSC-5% CB and MSC-10% CB during elastic stage under cyclic uniaxial compression. One representative specimen is shown for each mix design.

Figure 16A:
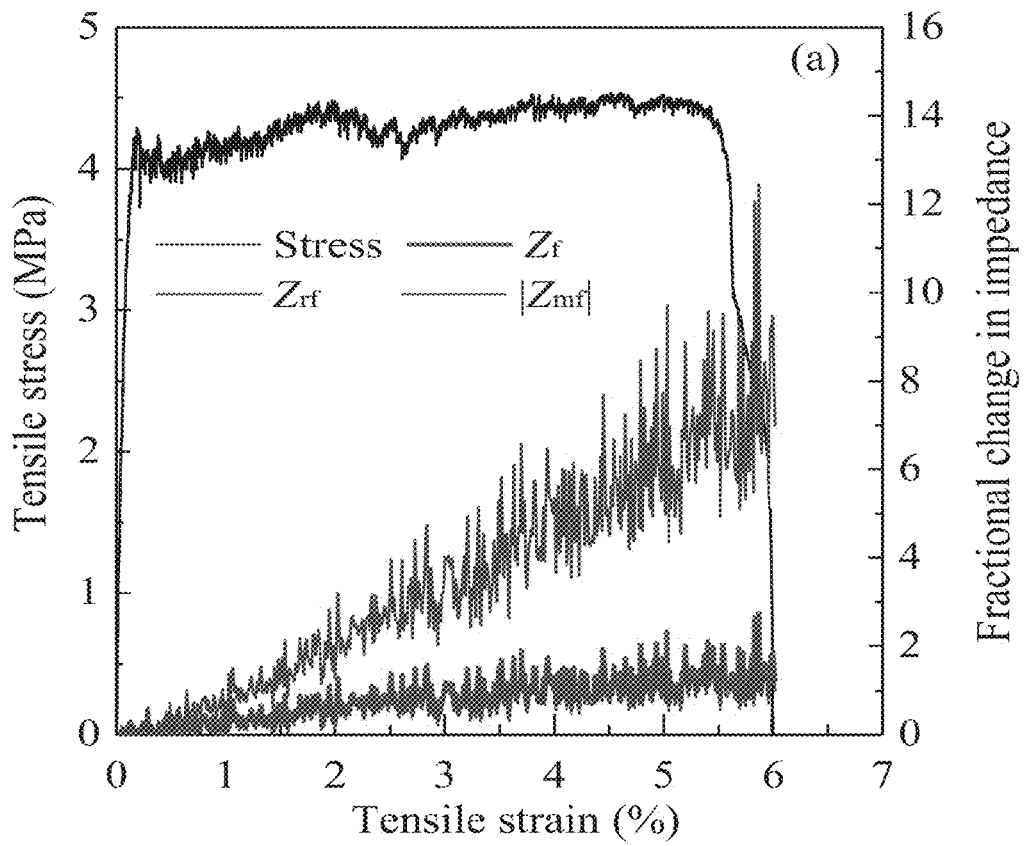
Figure 16B:
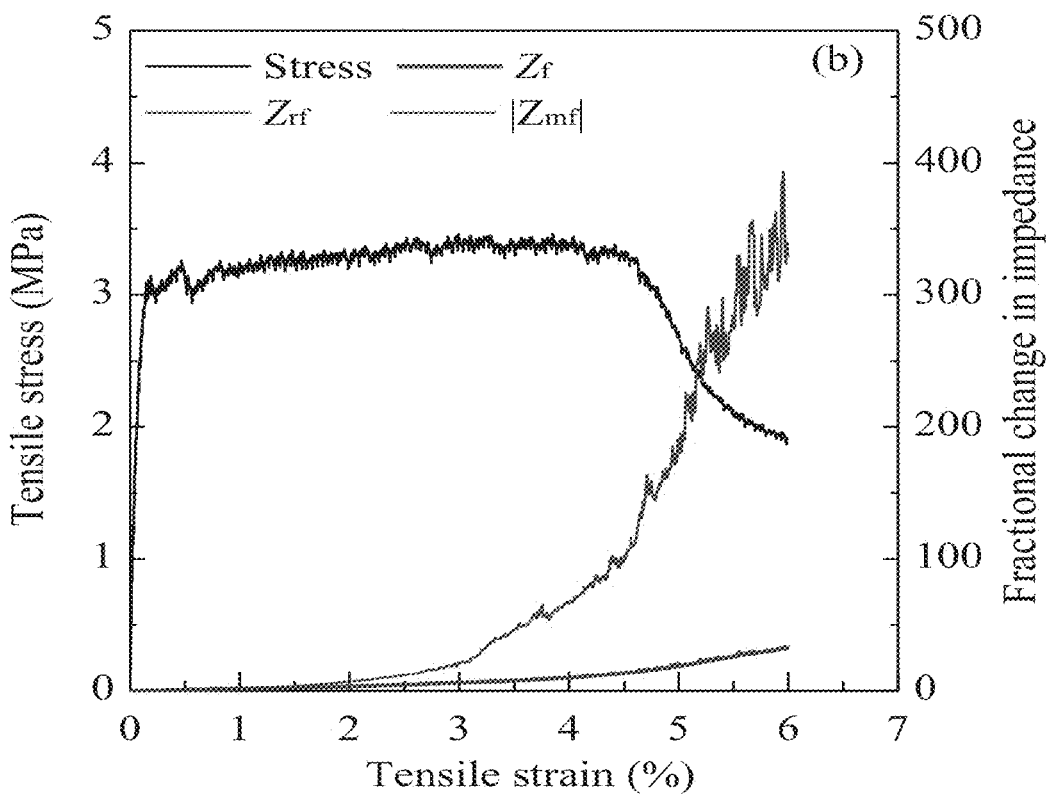
Figure 16C:
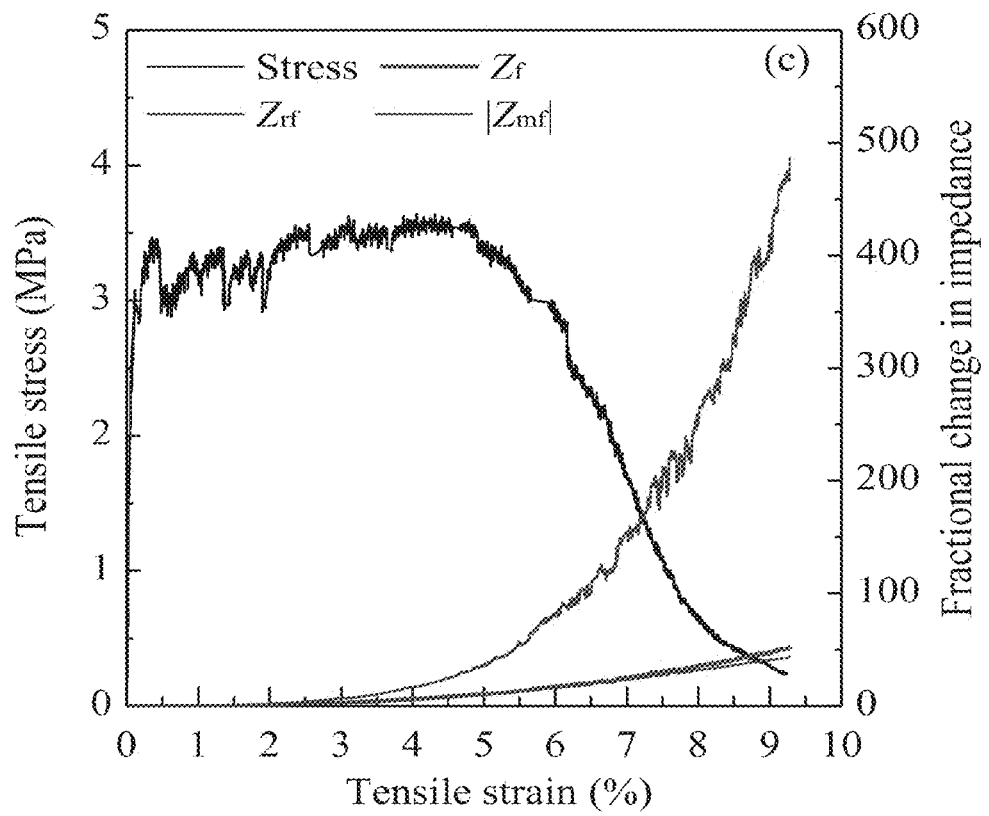
Figure 16D:
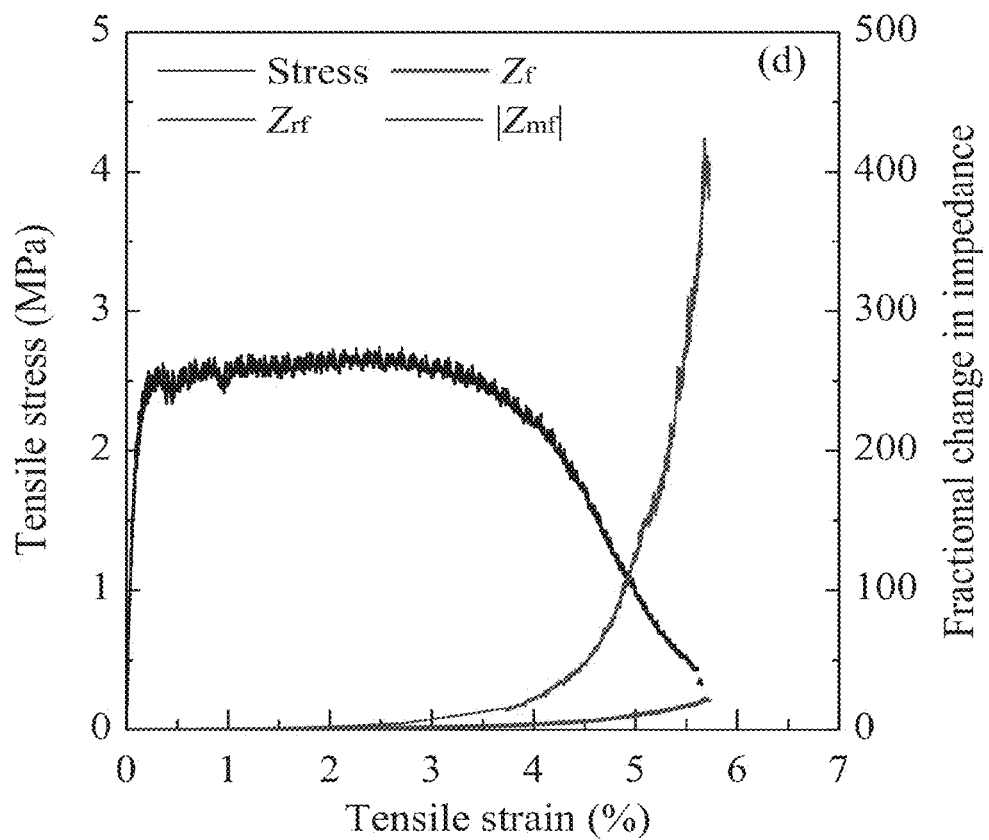

FIG. 16A shows the non-limiting examples of electromechanical behavior of SHC-0% CB. FIG. 16B shows the electromechanical behavior MSC-2.5% CB. FIG. 16C shows the electromechanical behavior MSC-5% CB. FIG. 16D shows the electromechanical behavior MSC-10% CB. $Z_f$ is the fractional change in impedance magnitude; $Z_{rf}$ is the fractional change in real part of impedance; $Z_{mf}$ is the fractional change in imaginary part of impedance.

Figure 17:
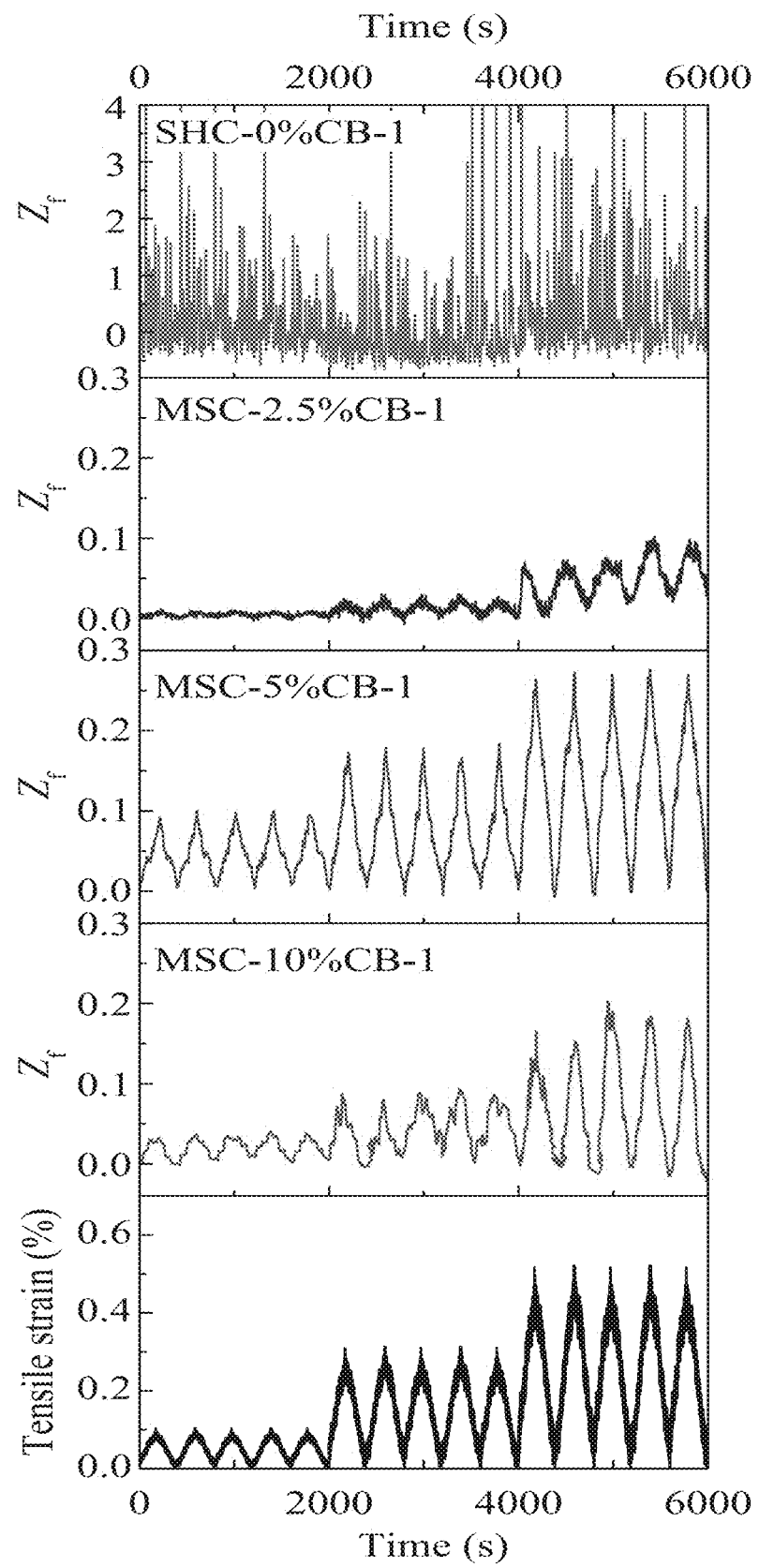

FIG. 17 shows the non-limiting examples of electromechanical behavior of SHC-0% CB, MSC-2.5% CB, MSC-5% CB and MSC-10% CB under reversed cyclic loading. One representative specimen is shown for each mix design.

DETAILED DESCRIPTION OF THE INVENTION

As used herein, strain-hardening (or pseudo-strain-hardening) in fiber-reinforced cementitious composite materials is a process that after the initial elastic stage, tensile stress increases with increasing tensile strain due to a sequential multiple microcracking process, leading to a tensile ductility hundreds of times larger than normal concrete. Such tensile ductility indicates large fracture energy, and is thus crucial for achieving ultra-high damage tolerance.

As used herein, the term "tension-softening" refers to a process where localized cracking occurs, accompanied by decreasing stress with increasing applied deformation and crack opening.

As used herein, the term "pozzolanic material" refers to siliceous and aluminous materials that can react with calcium hydroxide, a cement hydration product, to form additional calcium silicate hydrates or calcium aluminum hydrates.

As used herein, the term "even dispersion" refers to a good or nearly uniform distribution of a material in a mixture. This term may be used interchangeably with "uniform dispersion" unless otherwise specified. In a microscopic scale, the material particles are more or less evenly spaced or spread such that there is minimal to no clumping of the material. In some embodiments, the material may be evenly dispersed in the mixture if it has at least 80% distribution, and more preferably, at least 90% distribution.

As used herein, the term "ductility" refers to capacity that a solid material stretches under tensile stress.

In accordance with the present invention, the term "nano", when referring to size, indicates a size range of up to 1000 nanometers (nm). The term "micro", when referring to size, indicates a size range of 1 μm up to 1000 μm. As used herein, the term "multi-scale" is inclusive of the nano- to micro-size to milli-meter size ranges.

Referring now to FIGS. 1-17, the present invention provides novel multifunctional strain-hardening cementitious materials (MSC) that simultaneously possess extraordinarily high damage tolerance and self-sensing ability.

This high damage tolerance is achieved by transforming the brittle behavior of cementitious materials to a ductile behavior similar to metals under tension. Under tension, the MSC first exhibits an elastic response until it reaches its elastic limit before the first microcrack occurs, and then exhibits a pseudo-strain-hardening behavior (FIG. 1A) accompanied by the sequential formation of multiple microcracks (FIG. 1B), and finally, the material fails with localized cracking during the tension-softening stage. The pseudo-strain-hardening behavior leads to the large tensile ductility of the MSC, which is hundreds of times more than normal concrete and normal fiber-reinforced concrete with tension-softening behavior. In addition, the self-sensing capacity of the MSC is based on its unique electromechanical behavior: the elastic, pseudo-strain-hardening, and tension-softening stages of MSC are correlated with different fractional changes in material electrical impedance at different frequencies, with high signal-to-noise ratios. Under electrical probing, the spatial distribution of material complex impedance and its frequency dependency offers spatial information on the mechanical strain and damage levels within the material.

The present invention features a multi-functional cementitious material comprising water, cement, aggregates (e.g., sand, ground or fine quartz), about 5-70% weight (wt) of pozzolanic ingredients, about 0.1-30% vol of conductive particulates, plasticizers, and discontinuous reinforcing fibers, and optionally superplasticizers, accelerators, retarders, viscosity modifying agents. The combination of ingredients enables formation of a multi-scale structure. This multi-scale structure comprises a network of micro- to nano-sized pores, aggregates/matrix interfaces, and fiber/matrix interfaces in the cementitious composite material. This structure then exhibits a cracking behavior capable of dissipating energy through multiple microcracking with self-controlled crack widths of about 1 µm to 300 µm during strain-hardening stage such that the cementitious material is highly tolerant to damage. The multi-scale structure and network of partially conductive, conductive, and non-conductive paths in the cementitious material also enable the material to behave as an electrical self-sensor for measurement and monitoring of its mechanical and deterioration state.

The present invention further features a multi-functional cementitious material comprising about 3-30% wt of water, about 10-50% wt of cement, about 0-60% wt of aggregates (e.g., sand, ground or fine quartz), about 0-65% wt of pozzolanic ingredients, about 0.1-30% vol of conductive particulates, about 0.01-1% wt of plasticizer, and about 0.1-8% vol of reinforcing fibers. The said amounts of water, cement, aggregates, pozzolanic materials, conductive particulates, plasticizer, and reinforcing fibers enable formation of a multi-scale structure that comprises a network of micro- to nano-sized phases and interfaces, in the cementitious composite material. This material exhibits a cracking behavior capable of dissipating energy through multiple microcracking with controlled crack widths of about 1 µm to 300 µm during strain-hardening stage such that the cementitious material is highly ductile and tolerant to damage. The multi-scale structure of the cementitious material also enables a strongly coupled, high signal-to-noise-ratio macroscopic electromechanical behaviour such that the cementitious material behaves as a self-sensing material to detect and quantify mechanically-, chemically-, or environmentally-induced strain, damage, or deterioration with spatially continuous resolution wherever the material is located in a structure.

Without wishing to limit the invention to a particular theory or mechanism, the ratio or amounts of water, cement, aggregates, pozzolanic ingredients, conductive particulates, plasticizer, and reinforcing fibers can enable formation a multi-scale structure in the cementitious material. In some embodiments, the multi-scale structure may comprise a network of micro- to nano-sized pores, aggregates/matrix interfaces, and fiber/matrix interfaces.

In other embodiments, the multi-functional cementitious material may comprise about 10-20% wt of water, about 10-30% wt of cement, about 10-30% wt of aggregates (e.g., sand, ground or fine quartz), about 20-50% wt of a pozzolanic material, about 0.5-15% vol of conductive particulates, about 0.05%-0.5% wt of plasticizer, and about 1-6% vol of reinforcing fibers.

In some embodiments, the multi-scale structure may comprise a network of micro- to nano-sized pores, phases and interfaces. Preferably, this multi-scale structure can exhibit a cracking behavior capable of dissipating energy through multiple microcracking with crack widths of about 1 µm to 300 µm such that the cementitious material is highly tolerant to damage indicating that the material has a high capacity to undergo large deformation without rupture failure. Further still and without wishing to limit the invention to a particular theory or mechanism, the multi-scale network of partially conductive, conductive and nonconductive paths in the cementitious material may enable the material to behave as a self-sensor. This self-sensor ability can allow for measurement and monitoring of the material's mechanical state, such as strain and/or damage, for example cracking, reinforcement corrosion, and concrete deterioration.

In some embodiments, the pozzolanic ingredients may comprise fly ash, silica fume, or both. In some embodiments, substitution for fly ash and silica fume may include other siliceous or siliceous and aluminous materials such as calcinated clay, metakaolin, volcanic ash, rice husk ash. In one embodiment, a ratio of fly ash to silica fume may be about 0-10.0 parts fly ash to about 1 part silica fume by weight. Non-limiting examples of the cementitious material may comprise about 30-50% wt fly ash and about 5-12% wt silica fume.

In other embodiments, the conductive particulates may be carbon black nanoparticles, carbon nanofibers, carbon nanotubes, carbon-based particles, metal-based particles, metal oxide-based particles, or combinations thereof. In some embodiments, the conductive particulates may have a particle size, such as diameter or length ranging from 1 nm to about 500 µm.

In one embodiment, the plasticizer may be a superplasticizer. Without wishing to limit the invention to a particular theory or mechanism, the superplasticizer can reduce the water content in the material while maintaining or improving the desired rheological properties of the material. A non-limiting example of the plasticizer may be a polycarboxylate-based concrete superplasticizer. However, it is to be understood that this is but one example of a plasticizer; other types of plasticizers may be used in the present invention. In other embodiments, the plasticizer may comprise a combination of multiple superplasticizers. The plasticizer may also be used in combination with other concrete chemical admixtures, such as accelerator, retarder, or viscosity-modifying agent.

In some embodiments, the reinforcing fibers may comprise polyvinyl alcohol (PVA) fibers, polyethylene (PE) fibers, polypropylene (PP) fibers, metallic fibers, basalt fibers, or combinations thereof. Preferably, the reinforcing fibers can have a length ranging from about 1 mm to 100 mm. In another embodiment, the reinforcing fibers can have a fiber diameter ranging from about 1 µm to about 500 µm. In other embodiments, the diameter can range from about 1 µm to 100 µm.

According to another embodiment, the present invention may feature a concrete structural component comprising a cured product of any of the multi-functional cementitious materials described herein. Without wishing to limit the invention to a particular theory or mechanism, the ratios or amounts of the components making up the cementitious materials can enable formation of the multi-scale structure in the cured product of cementitious material. This multi-scale structure can cause the concrete structural component to exhibit a cracking behavior capable of dissipating energy through steady-state crack propagation and multiple microcracking with controlled crack widths of about 1 µm to 300 µm, thereby making the concrete structural component highly tolerant to damage. Meanwhile, the multi-scale structure of the cementitious material can enable the concrete structural component to behave as a self-sensor for measurement and monitoring of its mechanical state, such as strain and/or damage.

In preferred embodiments, since the concrete structural component can have a self-sensing ability imparted by the self-sensing cementitious materials, the present invention may feature a method of monitoring a mechanical state of the concrete structural component. The method may comprise attaching electrodes to the concrete structural component, passing a current through the concrete structural component via the electrodes, and measuring electrical response signals of the concrete structural component via the electrodes. In some embodiments, the electrical response signals may be a measurement of an electrical impedance of the concrete structural component. Without wishing to limit the invention to a particular theory or mechanism, the cementitious material surprisingly increases a signal-to-noise ratio (SNR) of the electrical response signal under a wide range of probing frequencies. The measured electrical response signals may be correlated to mechanical behaviours of the concrete structural component. For example, the correlation of the electrical response signals to the mechanical behavior may be indicative of a location or severity of deterioration or damage in the concrete structural component.

In further embodiments, the steps of attaching electrodes to the concrete structural component, passing a current through the concrete structural component via the electrodes, and measuring electrical response signals of the concrete structural component via the electrodes may be repeated over a period of time to obtain a set of electrical response signals. Similarly, the set of electrical response signals may be correlated to the mechanical behaviour of the concrete structural component. Without wishing to limit the invention to a particular theory or mechanism, this method may allow for the concrete structural component to be monitored over time to determine any changes in its mechanical state. For instance, the method may allow for measuring and monitoring strain, displacement, cracking, damage, distributed damage evolution, localized fracture, deterioration, or autogenous healing in the concrete structural component.

According to other embodiments, the present invention may feature a method of producing a multi-functional cementitious material having high damage tolerance and a self-sensing ability. In some embodiments, the method may comprise mixing about 10-50% wt of cement, with about 0-60% wt of aggregates (e.g., sand, ground or fine quartz), and about 0-65% wt of pozzolanic ingredients, to provide a uniform dry mixture. The dry components may be mixed for about 1-10 minutes to provide sufficient mixing time to produce the uniform dry mixture. Subsequently, about 3-30% wt of water and about 0.1-1% wt of plasticizer is added to the dry mixture. The water, plasticizer, and dry mixture are then mixed to form a cementitious paste having a viscosity favorable to providing an even dispersion (i.e., a good dispersion) of fibers and nanomaterials that enables workability. In some embodiments, the cementitious paste may be mixed for about 3-10 minutes to achieve the desired viscosity and rheological properties before fibers and nanomaterials are added and then further mixed to achieve a well-dispersed, coherent and homogenous mixture. The above method could be modified, for example, the mixing time at each step can be shortened or prolonged, depending on the construction needs, equipment, and the use of chemical admixtures such as accelerators or retarders. The mixing sequence can also be modified, for example, the nanomaterials or/and fibers can be added at the beginning together with other dry ingredients; or water and plasticizer can be mixed first, and then the dry ingredients will be slowly and sequentially added sequentially into the liquid mixture.

In further embodiments, the method may comprise adding about 0.1-8% vol of reinforcing fibers and about 0.1-30% vol of conductive particulates to the cementitious paste. The reinforcing fibers, conductive nanomaterials, cementitious and pozzolanic ingredients, water and superplasticizer are then mixed to produce the cementitious material having an even (or nearly even) dispersion of the reinforcing fibers and conductive nanomaterials. An accelerator, retarder, viscosity modifying agent, or combination thereof, can be added to adjust rheology and setting time for particular applications. The cementitious material may be mixed for about 3-10 minutes to ensure even dispersion. Without wishing to limit the invention to a particular theory or mechanism, the method of said addition of water, cement, aggregates, pozzolanic materials, conductive particulates, plasticizer, and reinforcing fibers in their specific amounts and mixing thereof can effectively produce a well-mixed multi-scale structure in the cementitious material.

Preferably, this multi-scale structure can exhibit a cracking behavior capable of dissipating energy through steady-state crack propagation and multiple microcracking with crack widths of about 1 μm to 300 μm, thus producing a cementitious material that is highly tolerant to damage. Further still, the multi-scale structure and nearly even dispersion of conductive particulates (e.g., nanomaterials) enable the cementitious composite material to have a strongly coupled, high signal-to-noise ratio macroscopic electromechanical behaviour such that the cementitious material to behave as a self-sensor for measurement and monitoring of its mechanical state to detect and quantify mechanically-, chemically-, or environmentally-induced strain (or displacement), damage (e.g. cracking, reinforcement corrosion) and/or deterioration with spatially continuous resolution wherever the material is located in a structure.

In some embodiments, the pozzolanic ingredients comprise fly ash and silica fume at a ratio ranging from 0-10.0 parts fly ash to 1.0 part silica fume by weight. In other embodiments, the conductive particulates have a particle or fiber size ranging from about 1 nm to 100 μm. The conductive particulates may be selected from a group consisting of carbon black nanoparticles, carbon nanofibers, carbon nanotubes, metal particles, and metal oxide particles.

In some embodiments, the plasticizer may be a superplasticizer. A non-limiting example of the plasticizer may be a polycarboxylate-based concrete superplasticizer.

The reinforcing fibers may be selected from a group consisting of polyvinyl alcohol (PVA) fibers, polyethylene (PE) fibers, polypropylene (PP) fibers, metallic fibers, basalt fibers, or combinations thereof. In some embodiments, the reinforcing fibers have a length ranging from about 1 mm to 100 mm, and a diameter ranging from about 1 μm to 500 μm.

In preferred embodiments, the strain, damage, and/or deterioration state are determined by electrical response measurements. The electrical response measurements of the MSC may be selected from a group consisting of impedance, resistance, capacitance, phase angle and/or their frequency dependency that reflect the level of strain, damage, and deterioration state of MSC or structural components made of the MSC.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Methods

The methods described below feature embodiments of the present invention and are used in the Examples described herein. The examples of the present invention provided herein show that the material design was accomplished by tailoring the micro-scale electrical and mechanical parameters to achieve strongly coupled electromechanical behavior at the macro-scale.

Initial Mix Design Incorporating Nonconductive Polymeric Fibers and Carbon Black Nanoparticles Four mixing proportions shown in Table 1 were initially designed. The control mix design, designated as SHC-0% CB, with "SHC" representing strain-hardening cementitious composite materials. SHC-0% CB contained water, Portland type I cement, fine silica sand (mean grain size=270 μm), class F fly ash (CaO<7%), a poly-carboxylate-based superplasticizer, and PVA fibers (length=8 mm, diameter=40 μm, 1.5% oil coating, strength=1,300 MPa, volume percentage=2%). In addition, carbon black (CB) nanoparticles were introduced into SHC-0% CB at a volume percentage of 2.5%, 5% and 10%, respectively, to tailor the electrical microstructure of the cementitious matrix. These three mix designs are designated as SHC-2.5% CB, SHC-5% CB and SHC-10% CB, respectively. CB nanoparticles are low-cost ingredients and most commonly used as a pigment and in automobile tires. The CB nanoparticles had an average size of around 40 nm, conductivity of 0.1 S/cm, and density of 1.8 g/cm$^3$. For all mix designs, the ratio among cement, fly ash and sand was kept the same. Due to the porous structure of CB nanoparticles and their large surface area, the water-to-binder ratio was increased with higher amount of CB to achieve appropriate rheology. The water-to-binder ratio was kept between 0.25 and 0.30. The effects of CB nanoparticles on equivalent circuit model parameters and tensile stress-strain relation in SHC material are descried in Examples 2-3 and shown in FIGS. 4A-4C and FIGS. 5A-5C.

Material Redesigns for Improved Tensile Ductility and Strength: MSC

The material tensile strain capacity and strength were improved by increasing the fiber/matrix interfacial bond, fiber bridging capacity $\sigma_0$, and matrix fracture toughness $K_m$. Table 1 shows the redesigned mixing proportions, designated as MSC-2.5% CB, MSC-5% CB and MSC-10% CB with "MSC" representing multifunctional strain-hardening cementitious materials. Silica fume with a 150 nm particle size was added at 13% by weight to the cementitious binder. Because the pozzolanic reaction and small particle size of silica fume increase packing density, refine pore structure and densify cementitious microstructure, it was believed that silica fume would densify the fiber/matrix interface transition zone, thereby improving the fiber/matrix interfacial bond and consequently increasing peak fiber bridging capacity across a crack ($\sigma_0$) and complementary energy ($J_b'$). Silica fume would also improve cementitious matrix strength and toughness $K_m$. In addition to silica fume incorporation, the water-to-binder ratio was adjusted in the redesigns to improve the rheology of the cementitious binder containing CB nanoparticles, which are porous and absorptive in nature. A more homogeneous mixture was thus formed with less entrapped larger air pores and more uniform fiber dispersion to improve $\sigma_0$. The fracture toughness test results (FIG. 6) confirm that compared with the initial designs, the redesigned mixtures exhibited increased matrix fracture toughness by 11.7%, 13.9%, and 14.9% at the CB content of 2.5%, 5%, and 10%, respectively. In addition, the single crack opening test results (FIGS. 7A-7D) show that $\sigma_0$ was increased from the initial design by 35%, 20%, and 19% at the CB content of 2.5%, 5%, and 10%, respectively, confirming the improvement in fiber/matrix interfacial bond.

FIGS. 8A-8D show that all the redesigned mixtures exhibited tensile strain-hardening behavior. Compared with the initial designs, the redesigns significantly improved both tensile strength and strain capacity at different CB nanoparticles contents. Based on the average of three repeat specimens for each mix design, the strength was improved by 16%, 24% and 32% at 2.5%, 5% and 10% of CB content, respectively. Also, the tensile strain capacity was increased from 1.82% to 5.24% at 2.5% of CB content, 1.97% to 4.30% at 5% of CB content, and 1.40% to 3.03% at 10% of CB content. These macro-scale observations validated the effectiveness of fiber/matrix interface tailoring at micro-scale, which increased $\sigma_0$ and the complementary energy $J_b'$ to promote more intensive multiple microcracking and larger tensile ductility.

The compression test results (Table 1) show that compared with the initial designs, the redesigned mixtures had improved average 28-day compressive strength by 13.1%, 24% and 26.5% at 2.5%, 5% and 10% CB content, respectively. This reflected the combined effects of increased matrix strength and toughness due to denser particle packing, pozzolanic reaction of silica fume, improved rheology that reduced larger air pores, and increased fiber bridging capacity. These macro-scale results validated the micromechanics-based material redesign to incorporate CB nanoparticles without scarifying key mechanical properties of cementitious materials.

Specimen Preparation

The specimens were prepared at laboratory temperature of 20±1° C. and relative humidity of 50±5%. All dry particles such as cement, fly ash, silica sand, and CB nanoparticles were mixed first for 3 minutes. Water and superplasticizer were then added to form a homogeneous mortar with the optimum rheology favoring a uniform dispersion of PVA fibers and CB nanoparticles. The PVA fibers were then added and mixed for 2 minutes to achieve a uniform dispersion. The nano-scale size of CB leads to a high tendency of particle agglomeration due to Van Der Waals forces. Therefore, a high shear rate is necessary to separate the agglomerates into smaller aggregates or single primary particles. In this study, high-structure CB rather than low-structure CB was adopted due to its high electrical conductivity, easier dispersion, and less dense packing. The less dense packing in high-structure CB allows increased entanglement with the cementitious binder to reduce the inter-particle attractive forces, facilitating the dispersion of the CB nanoparticles in the cementitious matrix. The fresh mixture was cast into three types of specimens: (1) coupon specimens (254 mm×51 mm×12.5 mm) for uniaxial direct tension tests; (2) coupon specimens (165 mm×51 mm×12.5 mm) for four-point EIS measurements; and (3) cylinder specimens (height=152 mm and diameter=76.2 mm) for uniaxial compression tests. The specimens were covered with plastic sheets after casting and demolded after 24 hours. The specimens were then water-cured till the age of 7 days, followed by air curing with a laboratory ambient temperature of 20±1° C. and a relative humidity of 45±5% till the age of 28 days. Afterwards, the specimens were exposed to outdoor environment, to simulate field conditions, till the testing at an age of 42 days. At least three repeat specimens were prepared for each type of testing scenario of each mix design.

Four-Point Electrical Impedance Spectroscopy (EIS)

Figure 3A:
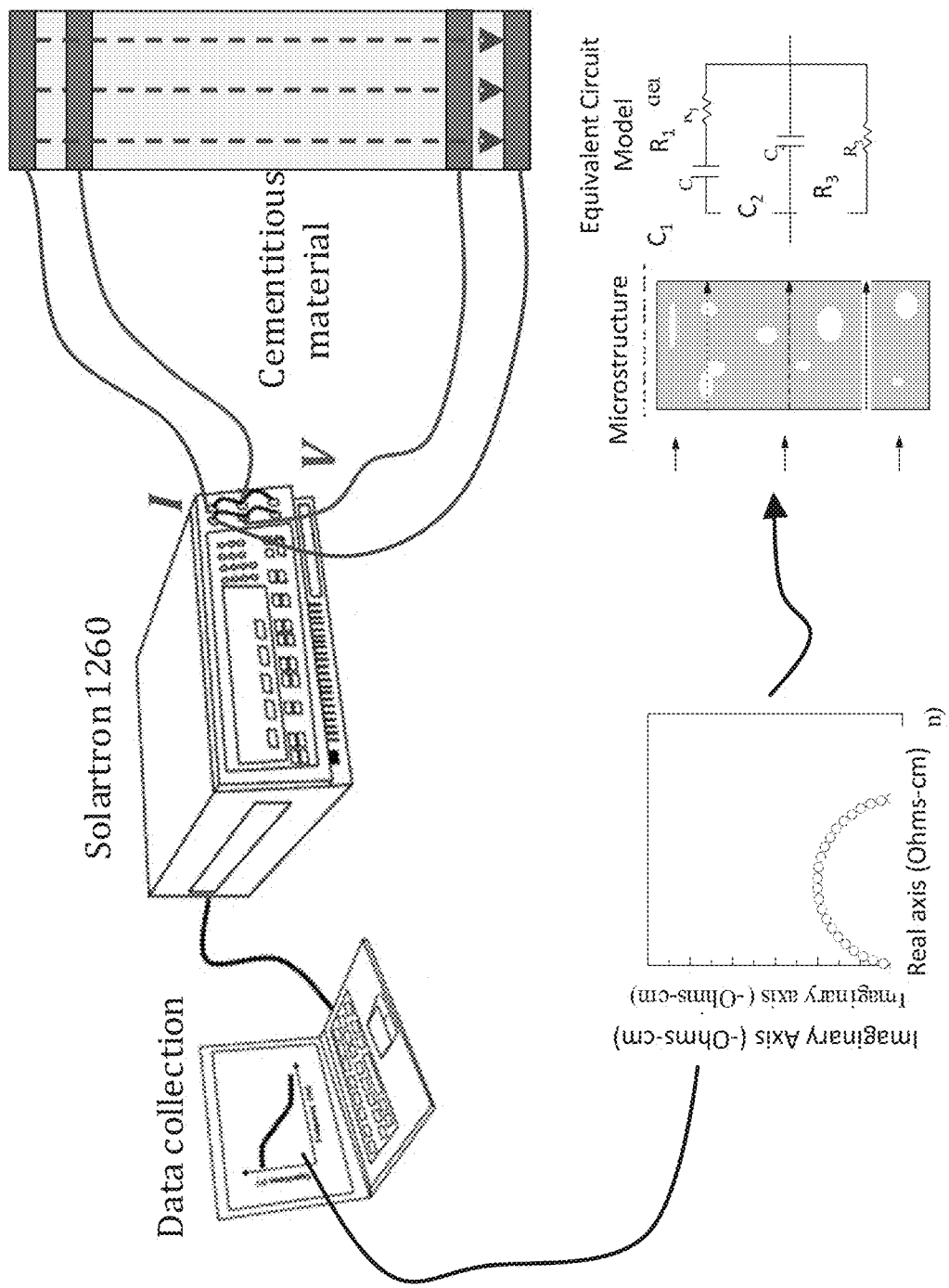
Figure 3B:
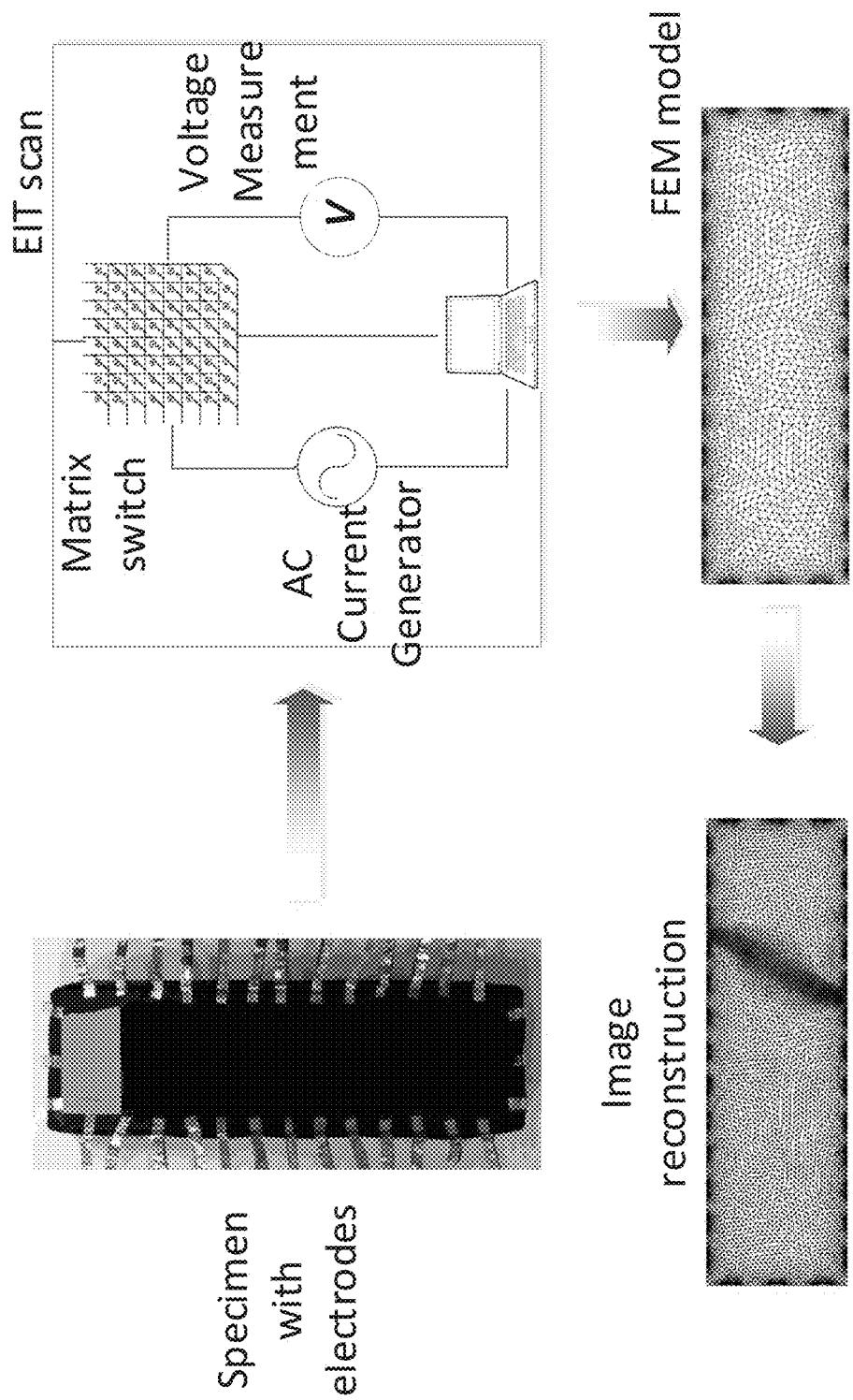
Figure 4A:
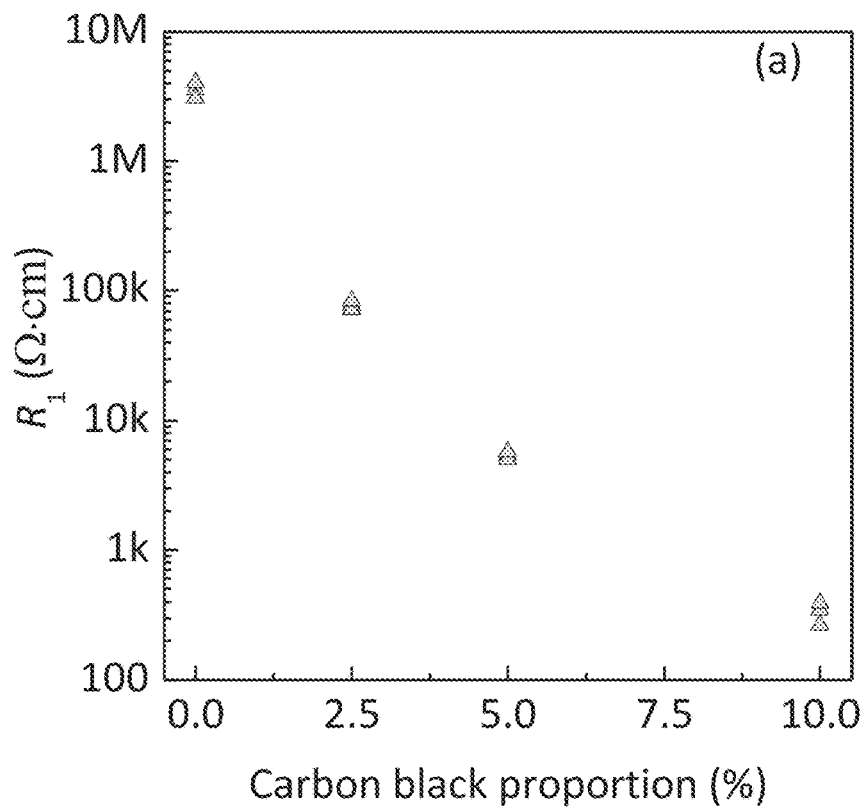
Figure 4B:
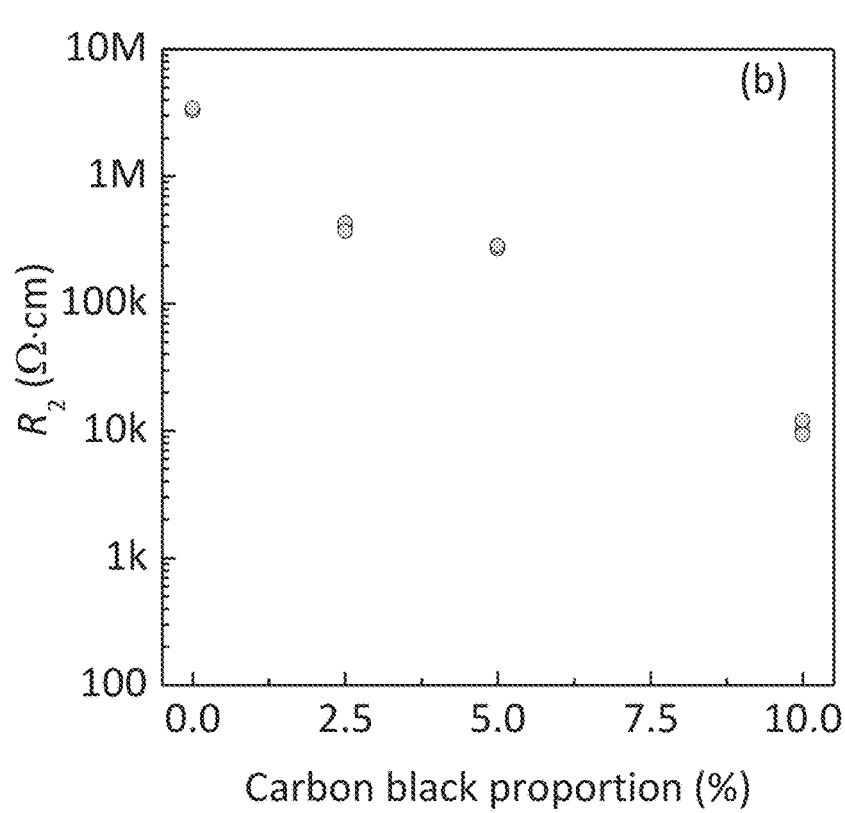
Figure 4C:
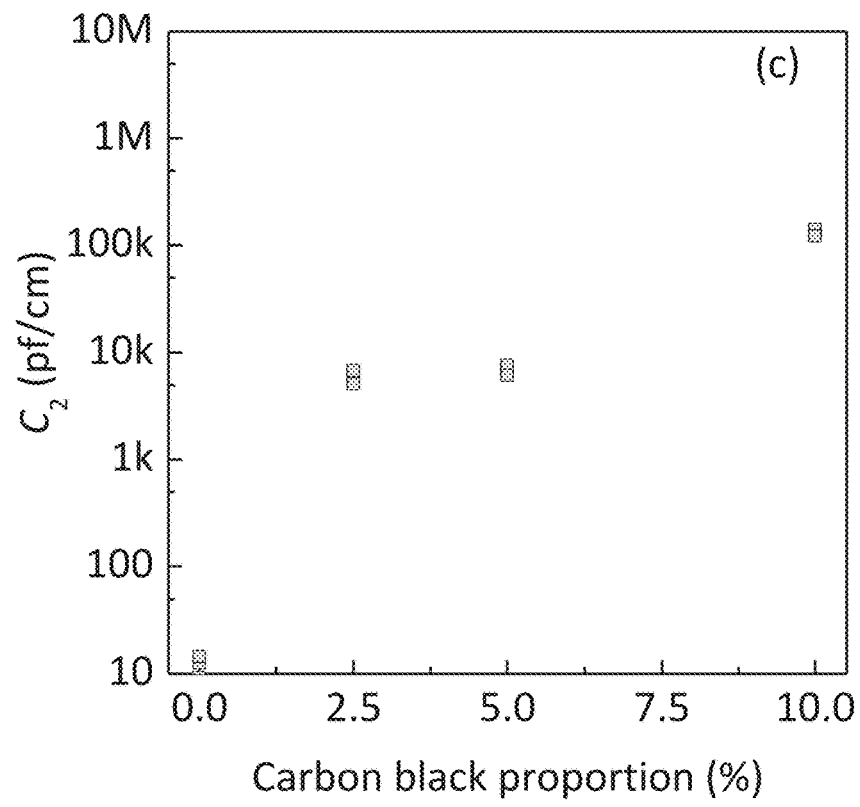
Figure 4D:
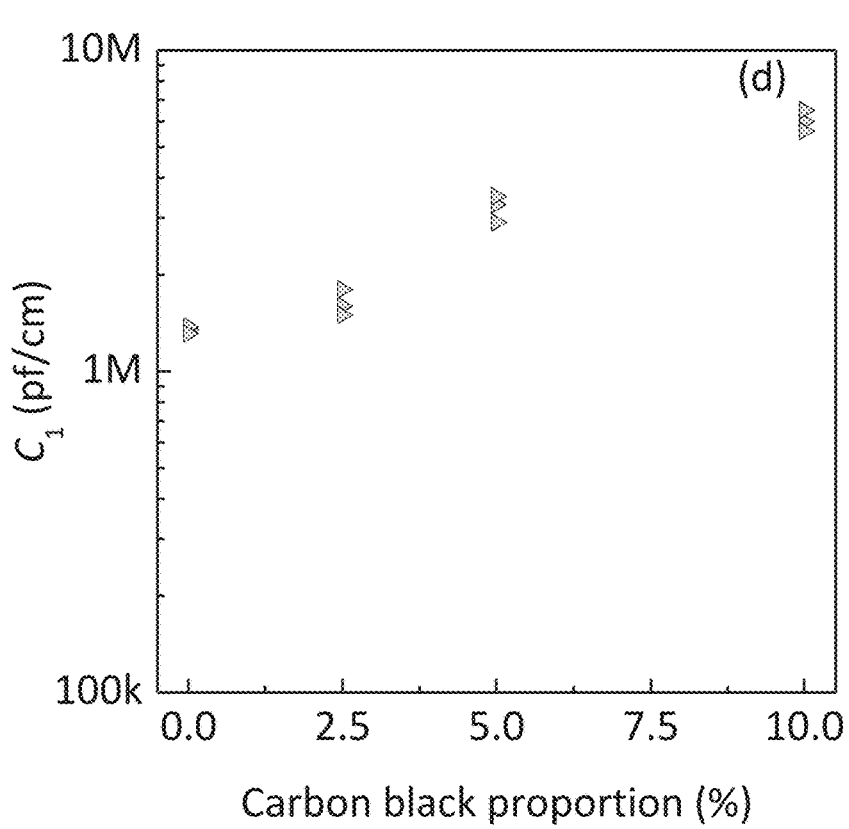
Figure 5A:
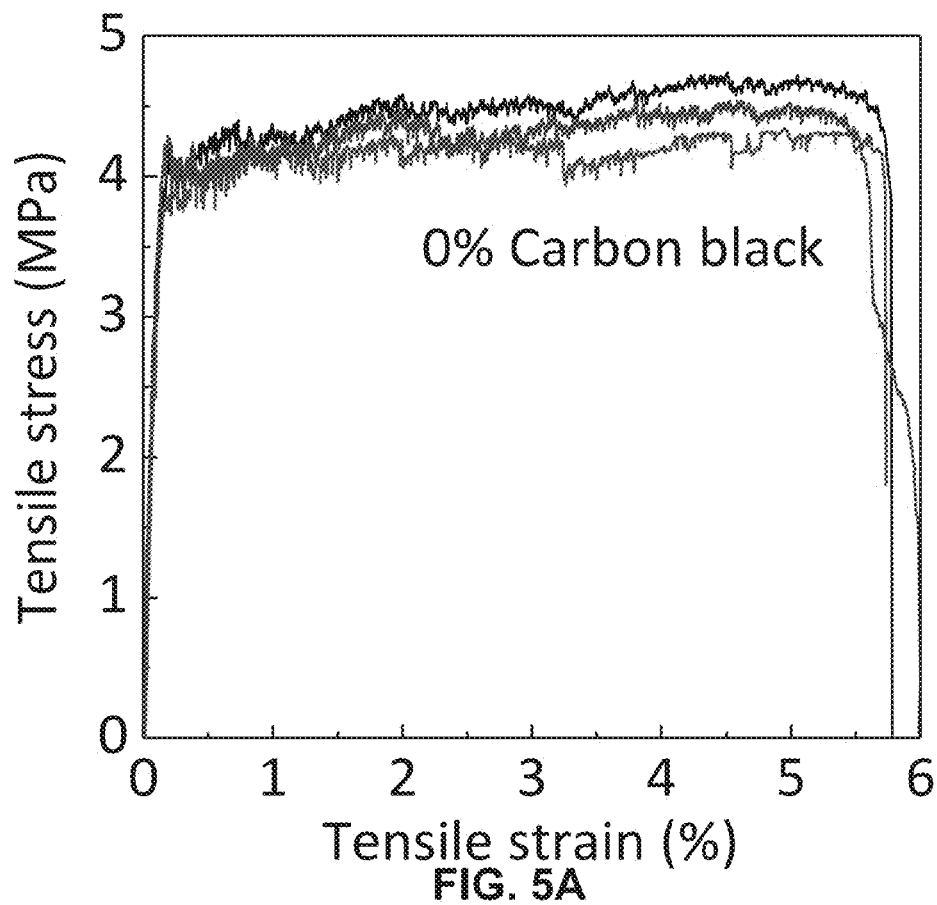
Figure 5B:
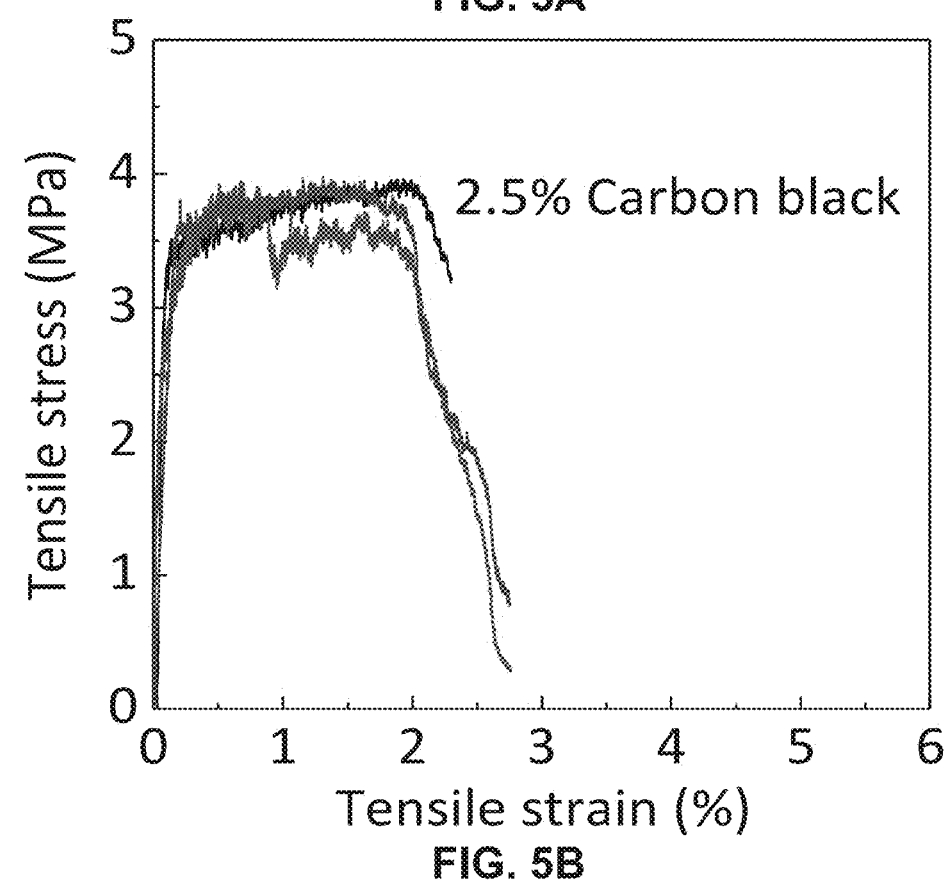
Figure 5C:
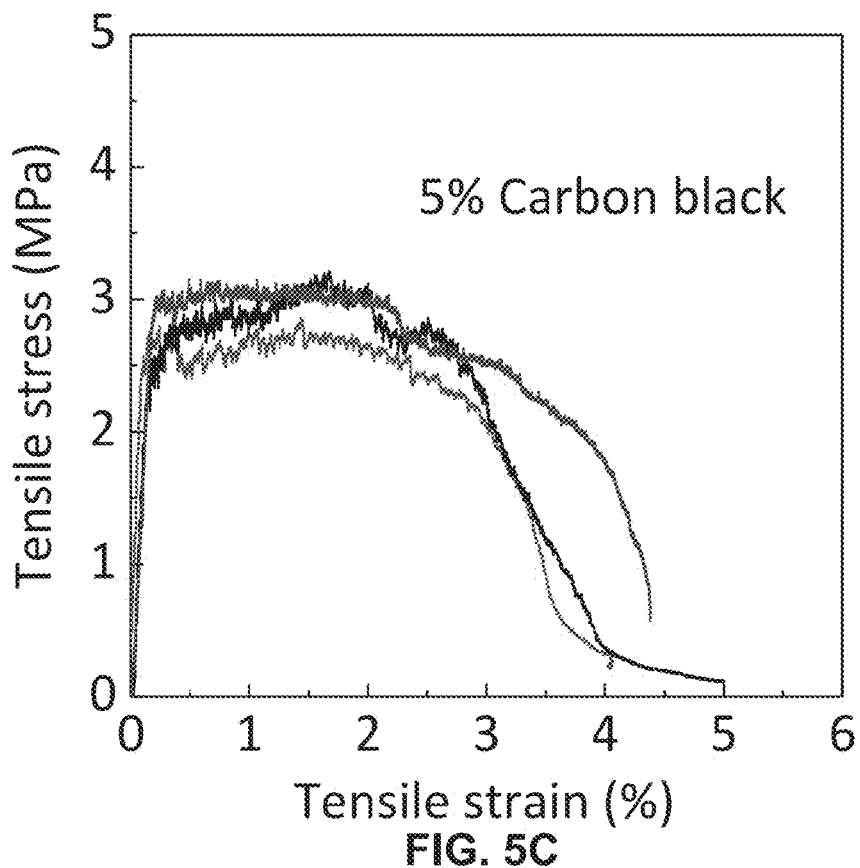
Figure 5D:
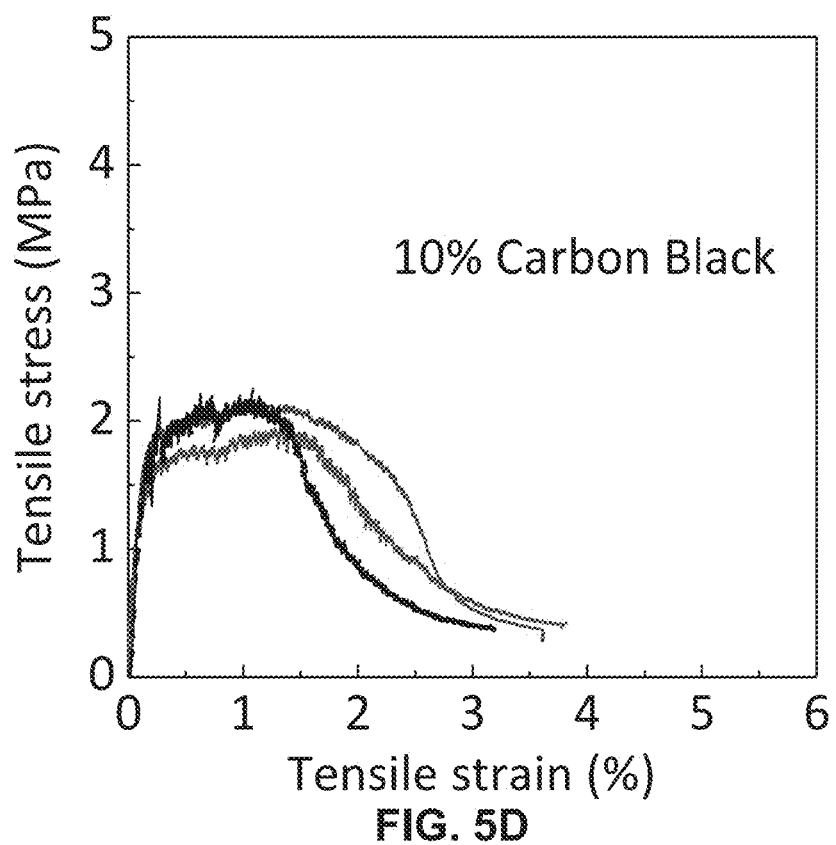
Figure 6:
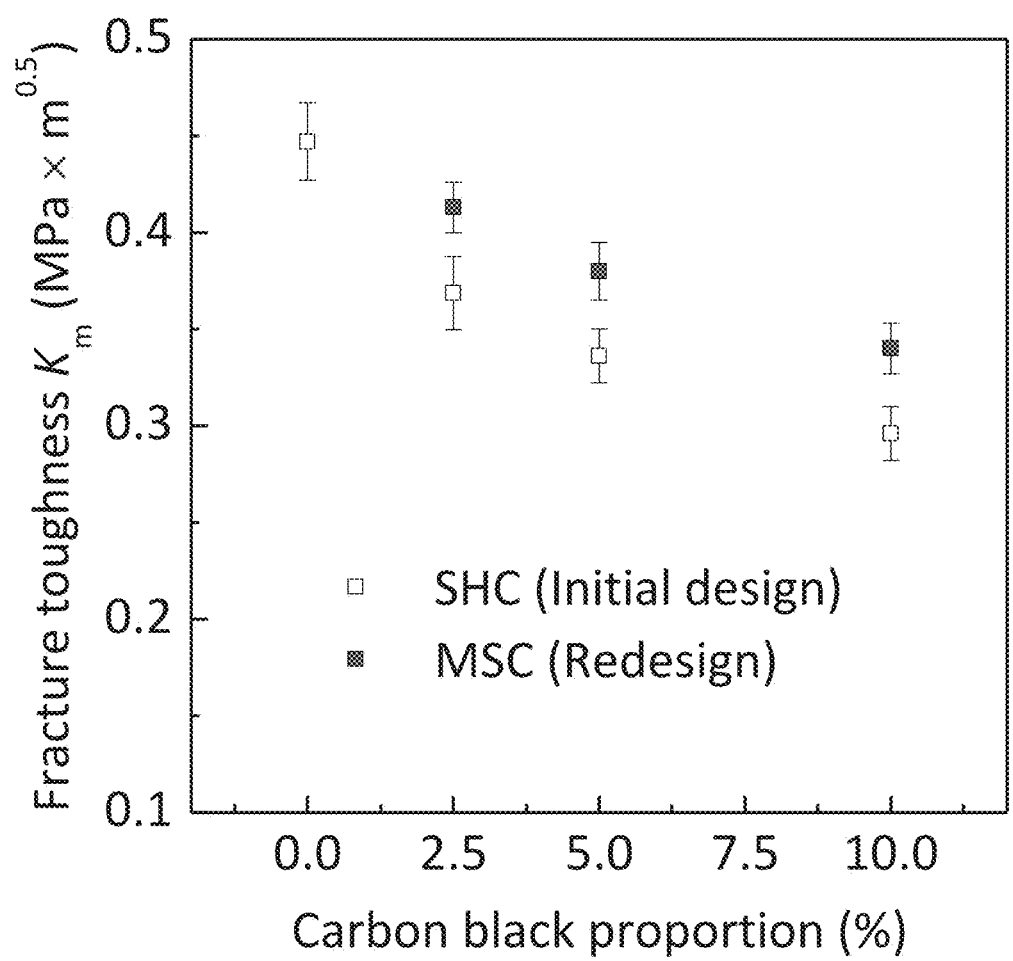
Figure 7A:
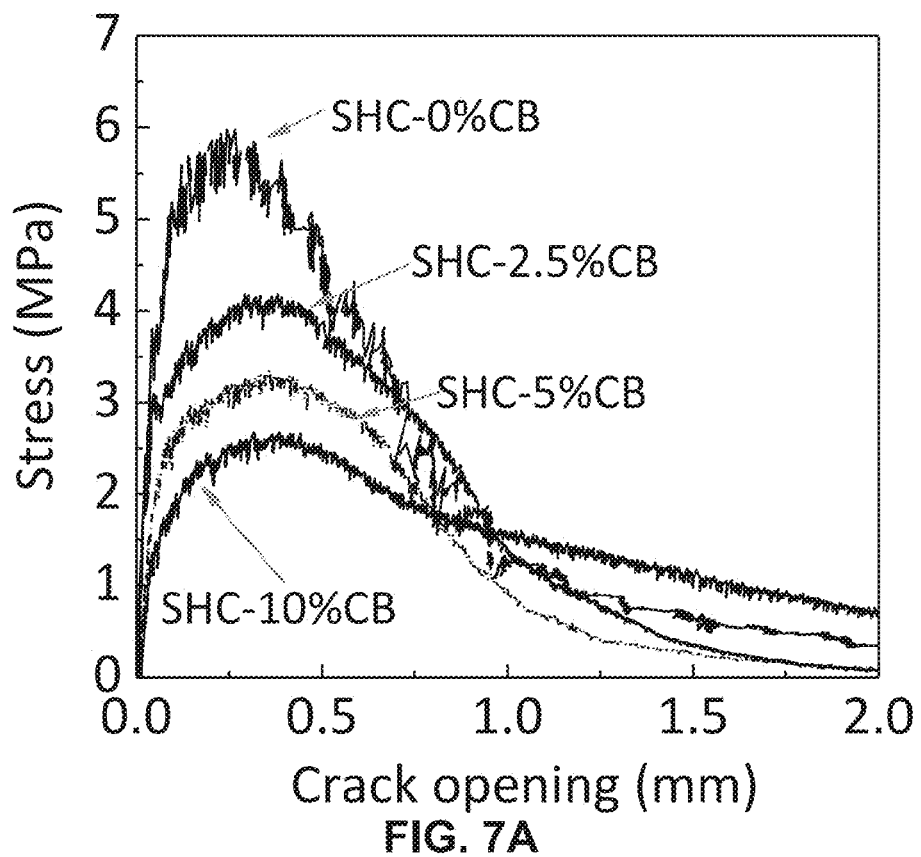
Figure 7B:
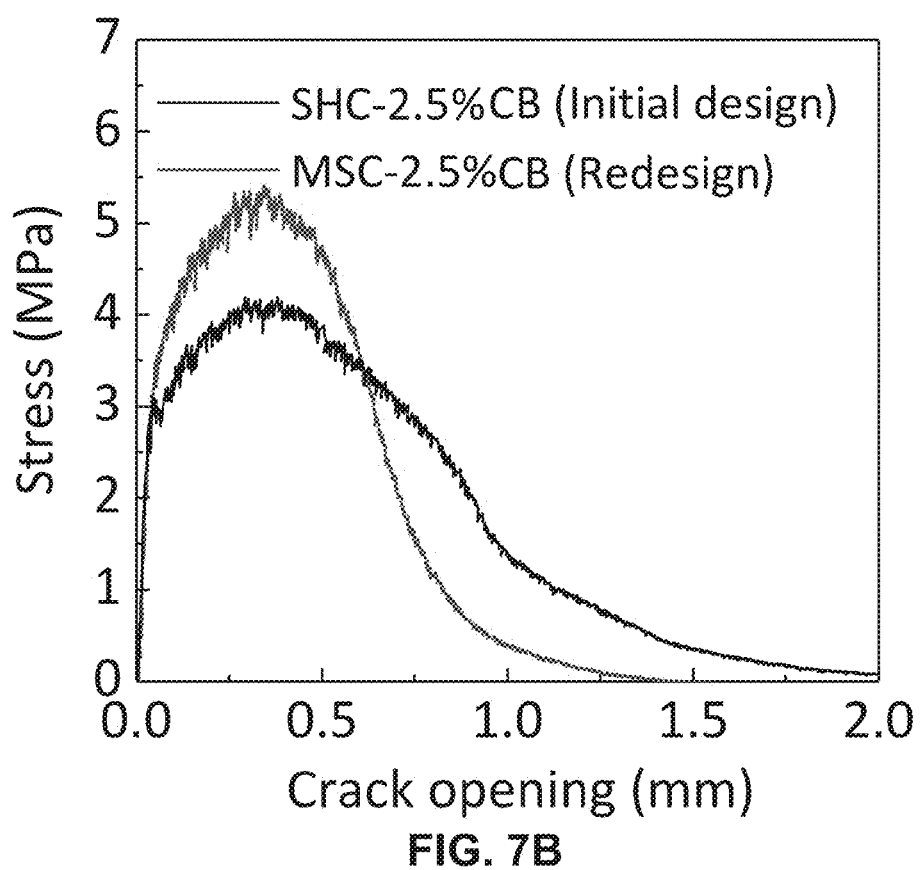
Figure 7C:
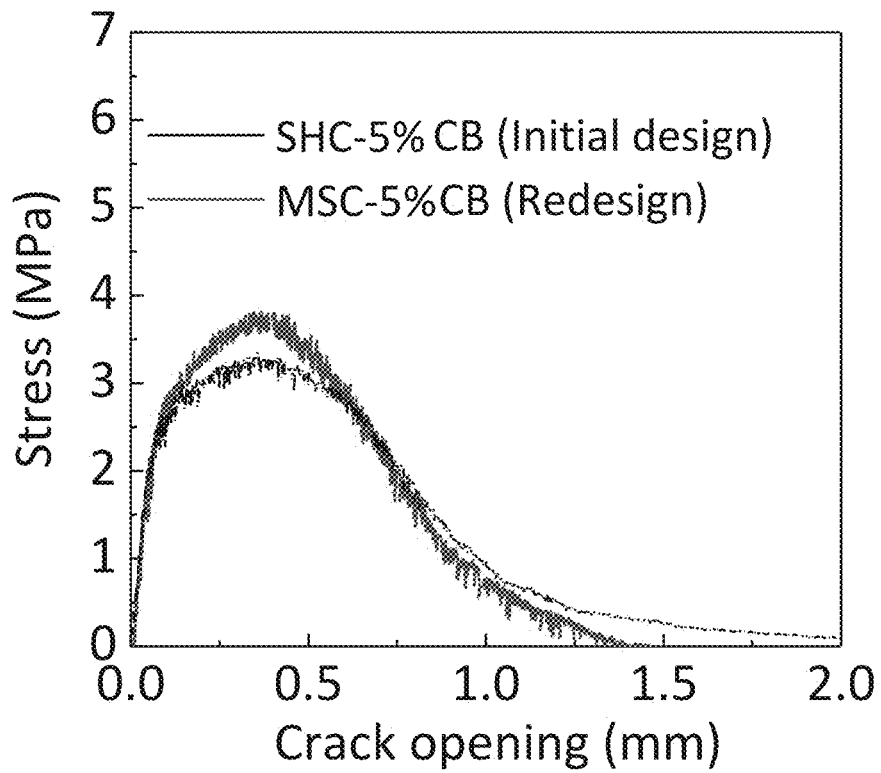
Figure 7D:
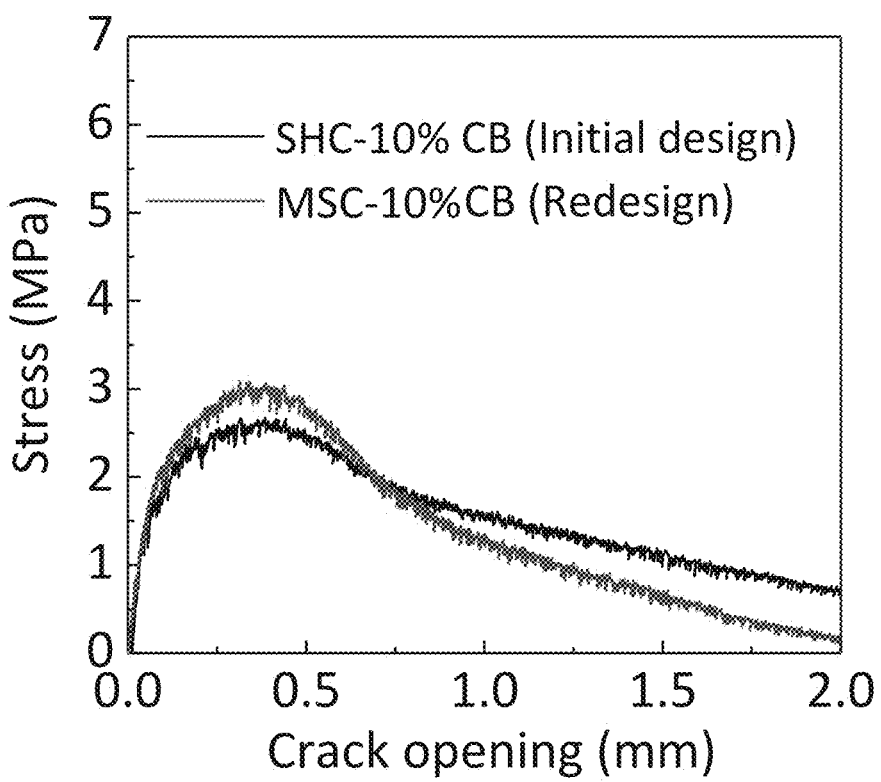
Figure 8A:
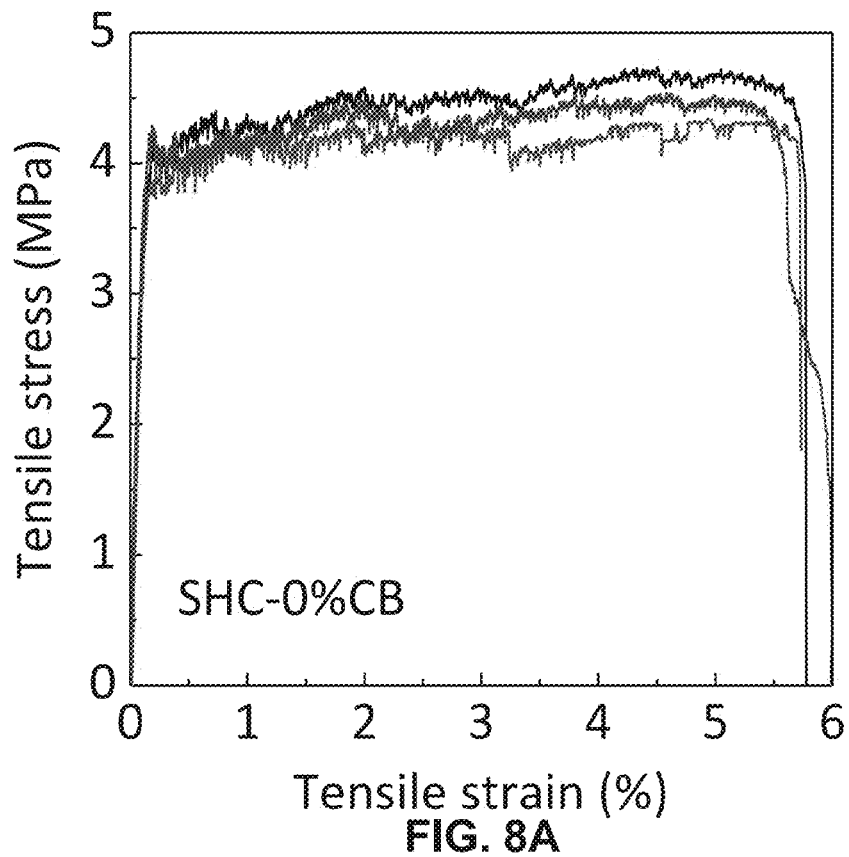
Figure 8B:
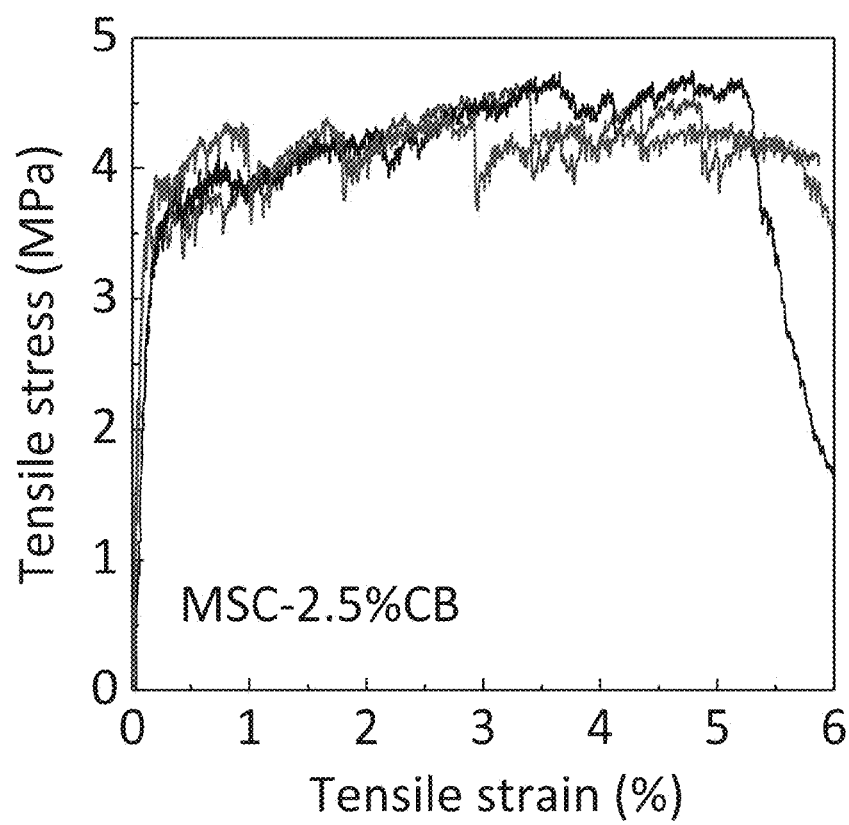
Figure 8C:
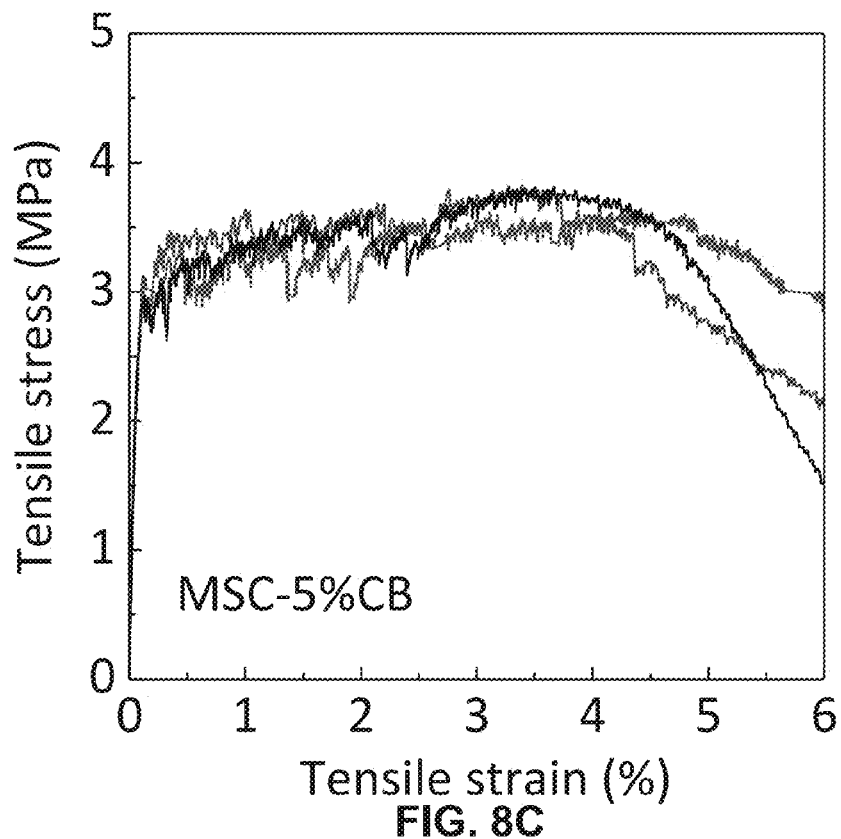
Figure 8D:
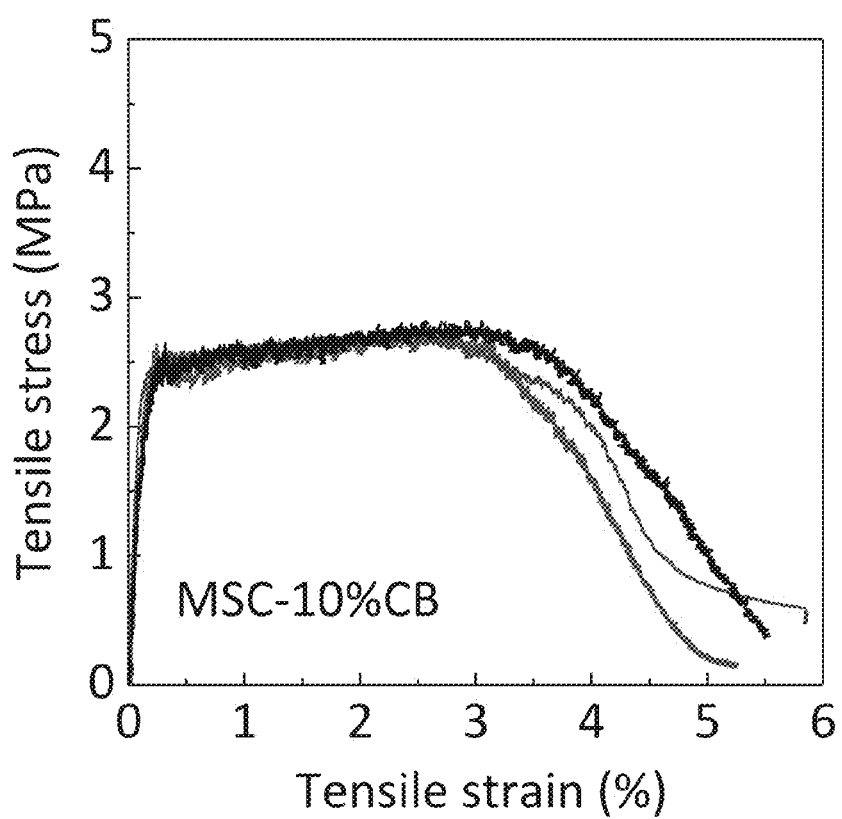

Non-limiting examples of EIS measurements on cementitious materials are shown in FIG. 3A. Frequency-dependent four-point EIS and equivalent circuit analysis were performed to understand the effect of various compositions including proportion of CB nanoparticles on the electrical microstructure and parameters of the cementitious specimens. Compared with DC resistance measurements, AC impedance spectroscopy is a more accurate method for characterizing the electrical properties of materials and their interfaces with electrodes. The results from AC EIS measurements can be correlated with many complex material variables, such as microstructure, dielectric properties, and compositional influences. EIS also allows analyzing material electrical parameters (e.g. resistance, capacitance) and explaining material frequency-dependent electrical response through equivalent circuit modeling. Furthermore, four-point EIS avoids contact impedance, as compared with two-point probing, and polarization effect during DC measurement.

Figure 9:
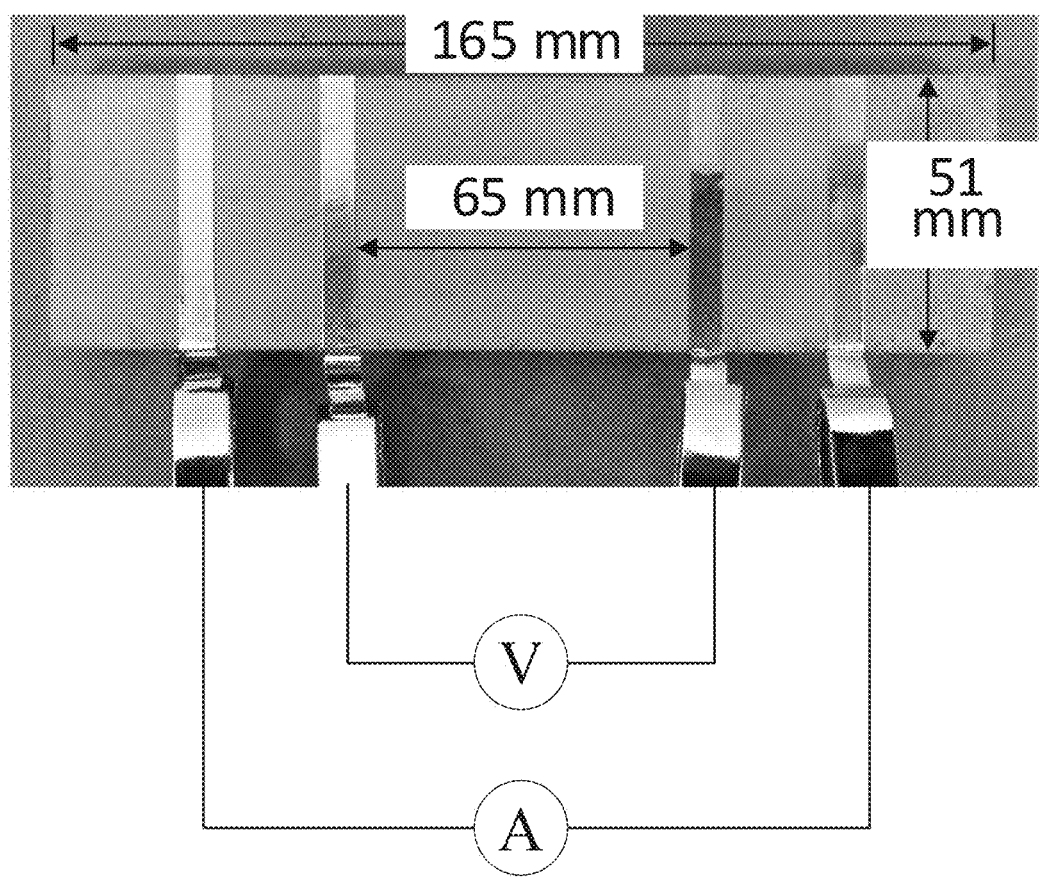
FIG. 9 shows a non-limiting example of an EIS measurement setup on an MSC specimen.

A non-limiting example of a specimen being tested is shown FIG. 9. Four copper electrodes were attached to the specimen surfaces with conductive silver colloidal paste (FIG. 9). The two outer electrodes injected AC current into the specimen at frequencies ranging from 0.1 Hz to 10 MHz. The two inner electrodes measured the in-situ voltage within the specimen. The electrodes were parallel to each other and spaced with sufficient distance in order for the current to be continuous and perpendicular to the electrodes. The EIS measurements were carried out using an impedance analyzer configured for a 100 mV amplitude excitation, slight enough to ensure the linear response of the material system. Complex impedance was measured at each frequency by injecting a single-frequency AC current to the specimen through the outer electrodes and measuring the amplitude and phase shift of the resulting voltage through the inner electrodes using Fast Fourier Transformation analysis of the response. Data were collected with 35 points per decade. The impedance as a function of frequency was then plotted to generate an impedance spectrum.

Electromechanical Experiment Program

The self-sensing functionality of MSCs is based on the coupling between material electrical impedance and its mechanical state. Therefore, the electromechanical behaviors of MSCs under tension and compression were studied. Three loading scenarios were considered: (1) monotonic loading at a displacement rate of 0.0025 mm/s up to specimen failure; (2) cyclic loading within elastic stage, ranging from 0 to 0.015% peak strain, at a strain rate of $7.5 \times 10^{-5}$ mm/mm per minute for eight loading cycles; (3) cyclic loading from 0 to 0.1% peak strain for 5 loading cycles, followed by from 0 to 0.3% peak strain for another 5 cycles and then followed by from 0 to 0.5% for 5 loading cycles. In this scenario, all the peak strains reached material inelastic stage where multiple microcracking had occurred. During each loading scenario, electrical impedance was continuously measured within a gauge length of 152 mm, by applying an AC current of 1,500 Hz to the specimen via outer electrodes and recording the amplitude and phase shift of the resulting voltage via inner electrodes. Twenty data points of impedance were collected per minute. Meanwhile, the axial deformation of the specimen was measured using DIC method to calculate tensile strain. In this way, the electrical impedance and tensile strain were correlated.

The electromechanical test under uniaxial compression was conducted on 152 mm (height) by 76.2 mm (diameter) cylinder specimens. Four copper electrodes were attached around the surfaces of each specimen. The AC current injection and four-point probing method were the same as in the uniaxial tension test. The top and bottom ends of each cylinder specimen were epoxy-coated to provide insulation from the metal caps. The specimen was cyclically loaded for eight cycles with a minimum strain of 0 and a peak compressive strain of 0.01% at the strain rate of $1 \times 10^4$ mm/mm per minute. During loading, the electrical impedance was measured at an AC frequency of 1,500 Hz. The relation between material electrical impedance and compressive strain under cyclic loading was then established.

EXAMPLES

The following are non-limiting examples of the present invention. It is to be understood that said example is not intended to limit the present invention in any way. Equivalents or substitutes are within the scope of the present invention. The examples of the present invention provided herein show that the material design was accomplished by tailoring the micro-scale electrical and mechanical parameters to achieve strongly coupled electromechanical behavior at the macro-scale.

Example 1 Design of Strain-Hardening Cementitious Composites

Figure 1A:
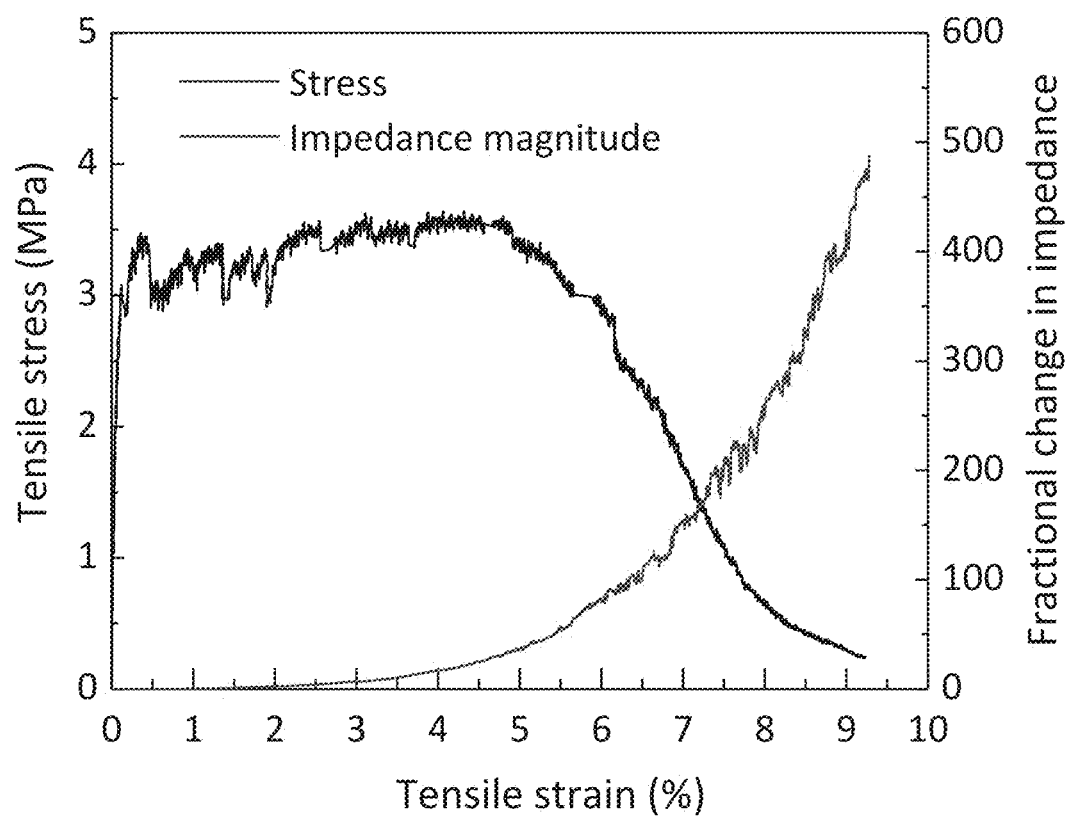
Figure 1B:
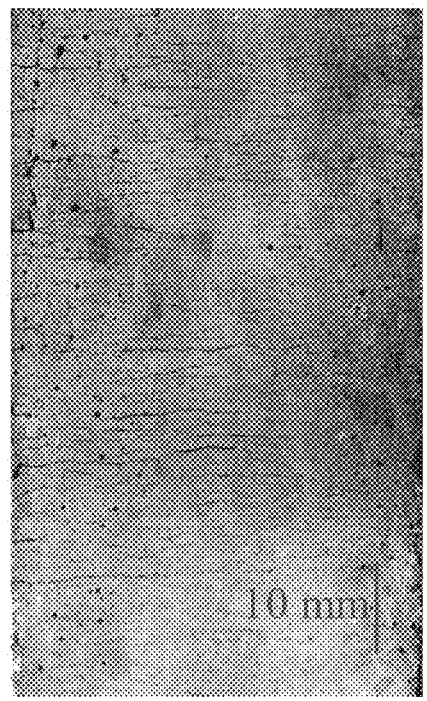

The high-performance damage tolerance of MSC is achieved by transforming the brittle behavior of cementitious materials to a ductile behavior similar as metals under tension. Under tension, the MSC material exhibits pseudo-strain-hardening behavior (FIG. 1A) accompanied by the sequential formation of multiple microcracks (FIG. 1B). This is in contrast with the brittle behavior of concrete with localized cracking formation. Each of the small stress "drops" on the stress-strain curve corresponds to the formation of a micro-crack that leads to a release of energy. The material design was achieved by integrating ingredient proportioning, rheology control during processing, and nano- and micro-structure tailoring. The cementitious matrix cracking behavior and the fiber/matrix interface were engineered through the nanoparticles and pozzolanic ingredients to dissipate energy through steady-state crack propagation and multiple microcracking with self-controlled crack widths around 40 μm. MSC's tensile strain-hardening behavior differentiates it from tension-softening fiber reinforced concretes such as steel, polymeric and carbon fiber reinforced concretes. MSC thus possesses ultra-high tensile ductility that is hundreds of times that of conventional concrete or fiber reinforced concrete, in addition to its self-sensing functionality. The self-controlled crack width can effectively prevent penetration of water, moisture and aggressive ions, and protect steel reinforcement from corrosion.

MSC's strain-hardening response achieved by the multiple microcracking process offers high damage tolerance, and is also crucial for self-sensing: First, the strain-hardening response corresponds to a largely extended damage process (inelastic stage), which provides damage tolerance while allowing detection of microcrack damage long before unstable localized fracture occurs, so that early warning is possible. Second, the strain-hardening stage also offers a larger gage factor and sensing sensitivity, which cannot be achieved by other self-sensing concrete with tension softening behavior.

Example 2 Effect of CB Nanoparticles on Material Electrical Microstructure and Parameters FIGS. 4A-4D data suggest that the strongest piezoresistive behavior can be achieved at around 5% CB content for a particular cementitious mix design. Beyond 5%, the decrease in $R_2$ slows down and the increase in $C_2$ becomes much faster (note the log scale), indicating that further increasing CB content reduces partially conductive paths by converting them into conductive paths. This study revealed the critical role of partially conductive paths, showing that strong electromechanical behavior can be achieved at an optimal range rather than the highest amount of CB nanoparticles.

Example 3 Effect of CB Nanoparticles on Material Tensile Behavior

Direct uniaxial tension tests were conducted on coupon specimens with the initial mix designs shown in Table 1. The tests were performed at a fixed displacement rate of 0.0025 mm/sec. The specimens were gripped at both ends by the testing system with a gripping length of 51 mm. Two LVDTs were attached to the sides of each specimen with a gauge length of 152 mm. FIG. 5 shows the measured tensile stress-strain curves. It was observed that the increasing amount of CB nanoparticles led to a decrease in material first-cracking stress, tensile strain capacity, and tensile strength. The first-cracking stress is defined as the tensile stress at which the first microcrack appears. The tensile strain capacity is defined as the strain corresponding to the tensile strength. Based on the average of three repeat specimens for each mix design, the tensile strain capacity decreased from above 5% to below 2% when CB nanoparticles were added. The tensile strength decreased by 16%, 33% and 55% at the CB content of 2.5%, 5% and 10%, respectively. The first-cracking tensile stress decreased by 15%, 29%, 59%, at CB content of 2.5%, 5% and 10%, respectively. This reduction in the tensile properties requires explanation from a micromechanical perspective, and the materials need to be tailored to improve their mechanical properties, especially tensile ductility.

Example 4 Effect of CB Nanoparticles on Fiber-bridging Behavior and Matrix Toughness To ensure tensile strain-hardening behavior, the synergistic interaction among the fibers, cementitious matrix, and fiber/matrix interface were tailored based on micromechanics theory. To understand the observed negative impact of CB nanoparticles on the tensile ductility and strength of SHC, two types of experiments were performed: (1) single crack opening test to measure the $\sigma$~$\delta$ relation. The relation reflects the fiber/matrix interfacial bonding properties, and is used to determine $J_b'$ and $\sigma_0$; (2) matrix fracture toughness test to determine the $J_{tip}$ of the cementitious matrix without PVA fibers.

FIGS. 7A-7D show $\sigma$~$\delta$ relations from the single crack opening tests. Increasing CB nanoparticles from 0% to 2.5%, 5% and 10% decreased the peak fiber bridging stress $\sigma_0$ across the crack by 33%, 43% and 58%, respectively. Increasing the amount of CB nanoparticles also increased the critical crack opening $\delta_0$ at $\sigma_0$. The decrease in $\sigma_0$ and increase in $\delta_0$ indicated a decrease in fiber/matrix interfacial bond. PVA fibers are generally hydrophilic and tend to form an exceedingly strong bond with cementitious matrix. Therefore, the PVA fibers are prone to rupture under pullout loading rather than being pulled out from the cementitious matrix, leading to low complementary energy $J_b'$ that disfavors steady-state crack propagation and strain-hardening behavior. To increase $J_b'$ by reducing fiber/matrix interfacial bond, PVA fibers with 1.2% oil-coating were used. However, when a large amount of CB nanoparticles was introduced to the material system, the fiber/matrix interfacial bond was further reduced due to the lubrication effect of CB nanoparticles. This significantly weakened the bridging effectiveness of PVA fibers during the crack opening. The reduction of $\sigma_0$ had three negative effects on the tensile behavior of the cementitious composite material: (1) It decreased $J_b'$, which potentially violated the steady-state crack propagation criteria and led to a reduction or loss of tensile strain-hardening behavior; (2) A lower $\sigma_0$ permitted less amount of intrinsic flaws in the cementitious matrix to be activated to form microcracks before crack localization, resulting in a lower tensile strain capacity; (3) a lower $\sigma_0$ led to a lower tensile strength of the material. These findings on micromechanical parameters are consistent with the tensile stress-strain relations shown in FIGS. 5A-5D.

Example 5 Electromechanical Behavior of MSCs

Figure 2A:
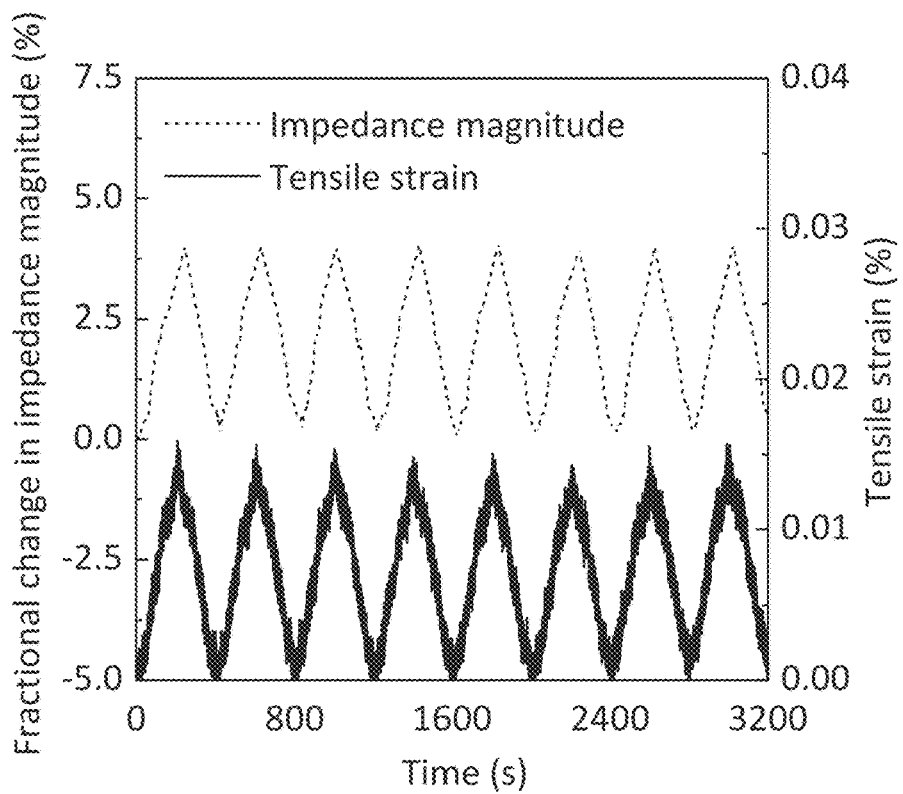
Figure 2B:
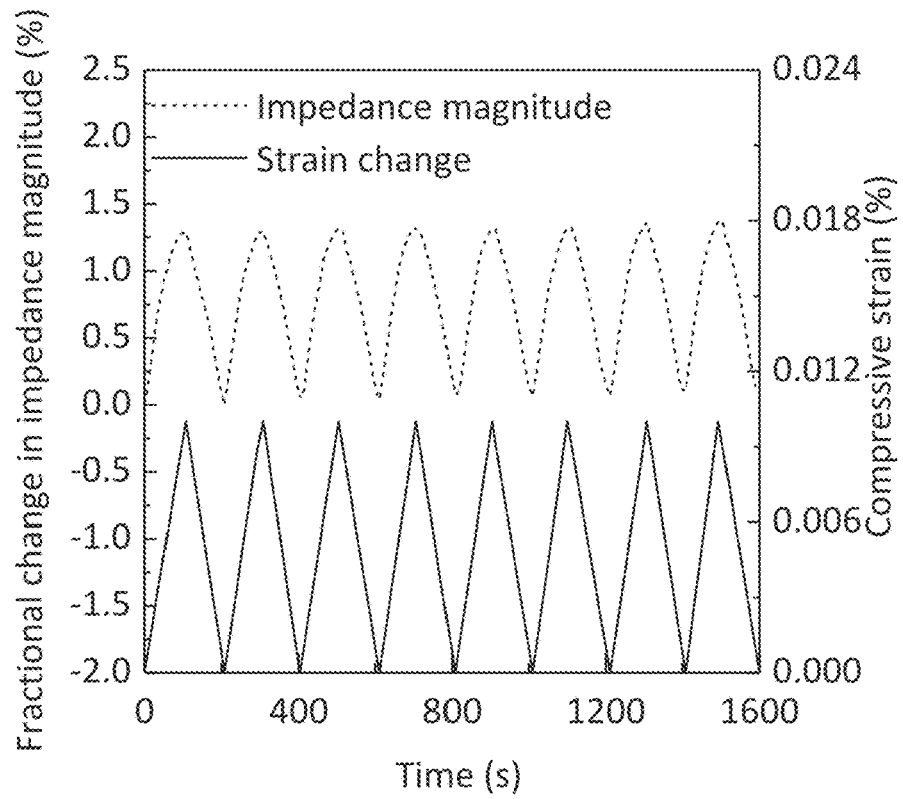
Figure 2C:
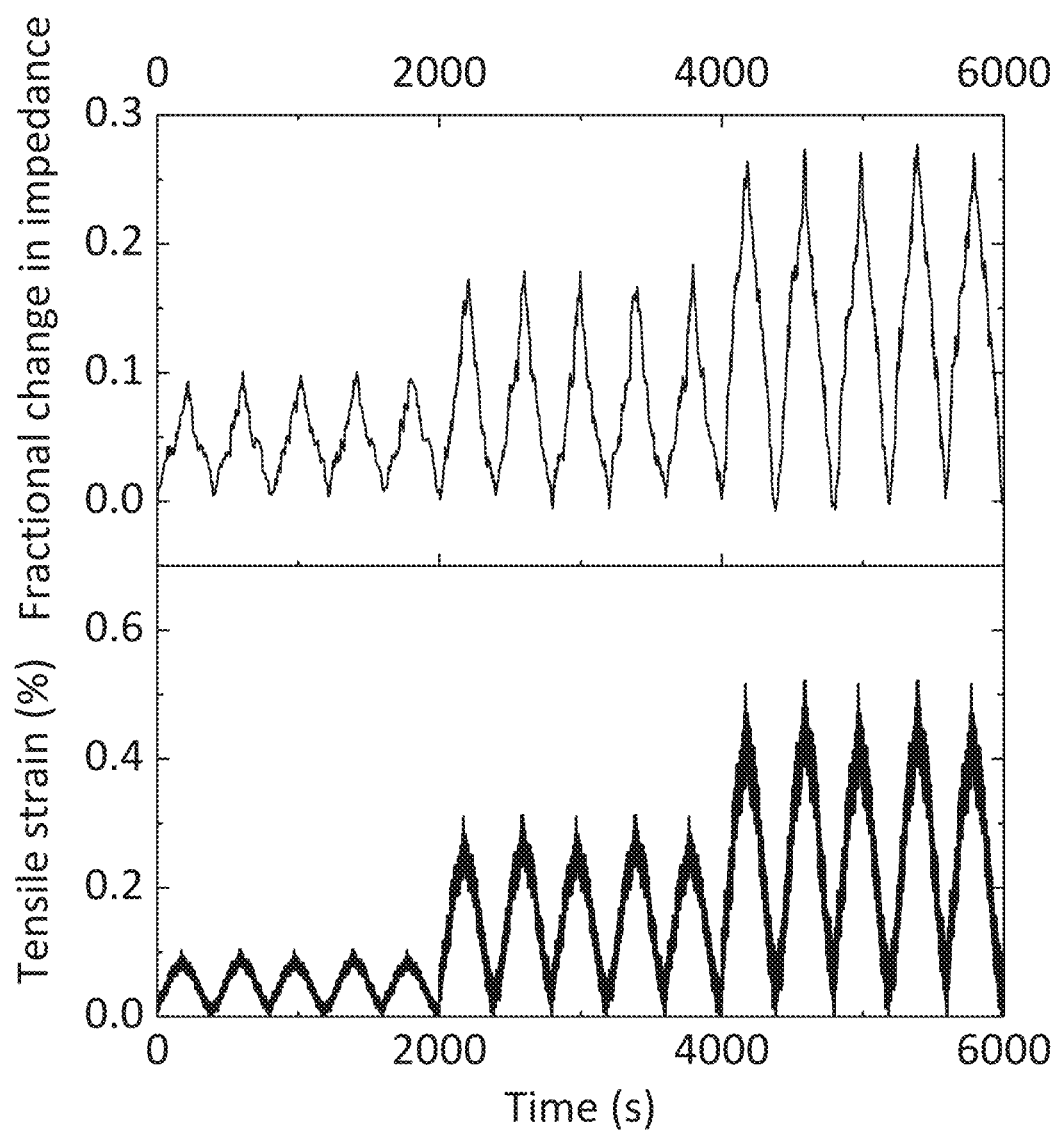

MSCs integrate a ductile tensile behavior with a strongly coupled electromechanical response needed for self-sensing. The material design was achieved by tailoring the microscale electrical and mechanical parameters, a process guided by AC impedance spectroscopy, equivalent circuit modeling, and micromechanics theory. The strain-sensing capacity of MSC is shown in FIG. 1A, and FIGS. 2A-2C. During elastic straining stage (FIGS. 2A-2B), the increasing and decreasing mechanical strain can be accurately reflected by the increasing and decreasing electrical impedance of the MSC through large gage factors. When the material goes beyond elastic stage and enters pseudo-strain-hardening stage, the increased elastic strain accompanied by the formation of multiple microcracks can also be clearly captured through the change in electrical impedance (FIGS. 1A and 2C).

Figure 10:
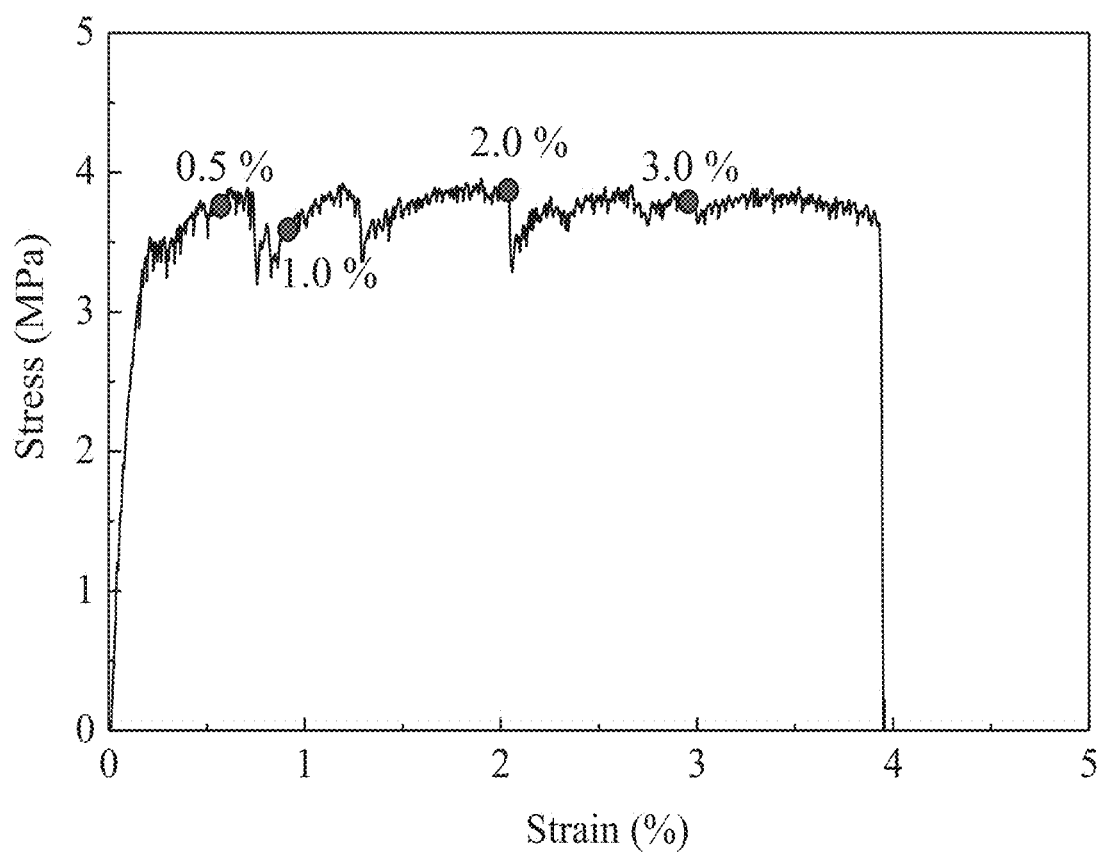
FIG. 10 is a non-limiting example of different mechanical strains of MSC at which electrical impedance tomography is performed with results shown in FIG. 11.
Figure 11:
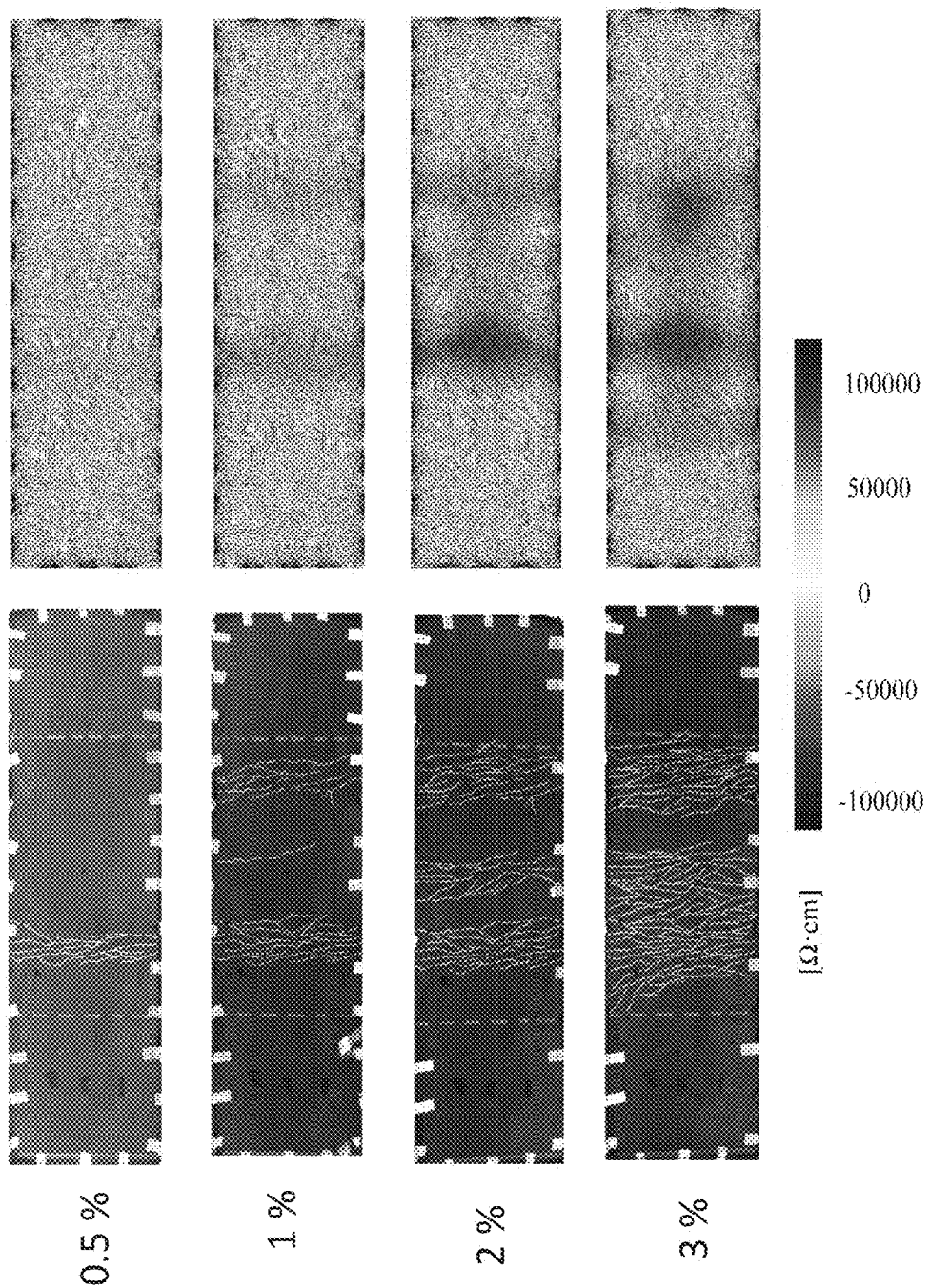
FIG. 11 is a non-limiting example of actual microcracking damage in the MSC, shown in the left panel at different mechanical strains as shown in FIG. 10. The image reconstructions of damage location and levels in the MSC are shown in the right panel.

In addition to strain sensing, the damage sensing capacity of the MSC is shown in FIG. 10 and FIG. 11. Electrical impedance tomography (EIT) was performed on MSC specimens to realize damage sensing. The present invention made it possible to visualize material impedance, which reflects strain and damage levels, in three dimensions based upon voltage measurements collected in MSC specimens in a multitude of probe locations. For example, at the different strain and damage levels shown in FIG. 10, image reconstruction based on EIT clearly depicts the location and intensity of microcracking damage in the MSC (FIG. 11).

Electromechanical Behavior Under Cyclic Tension and Compression within Elastic Stage FIG. 14 shows non-limiting examples of the electromechanical behavior of MSCs in comparison with the control SHC-0% CB under cyclic uniaxial tension within the material elastic stage. Both tensile strain and the fractional change in impedance magnitude were plotted versus loading time. SHC-0% CB did not show a clear trend of change in $Z_f$ with tensile strain. $Z_f$ fluctuated around a constant value, suggesting that the measurements were accompanied by a high level of noise. An overall high impedance magnitude at the order of $1\times10^7$ $\Omega \cdot$cm was also observed. The phenomena were attributed to the highly heterogeneous electrical microstructure and a large number of nonconductive and partially conductive paths in SHC-0% CB at a low moisture level at the age of 42 days.

In contrast, a linear correlation between $Z_f$ and the tensile strain was obvious for MSC-2.5% CB, MSC-5% CB, and MSC-10% CB. For MSC-2.5% CB, although $Z_f$ was accompanied by some level of noise, it is clear that $Z_f$ nearly linearly increased with increasing tensile strain, and decreased with decreasing tensile strain. For the 5% and 10% MSC specimens, the linear relation between $Z_f$ and tensile strain had little noise. Overall, the results show that compared with the control SHC-0% CB, the newly designed MSCs exhibited significantly higher signal-to-noise ratios and stronger piezoresistive behavior under tension during the elastic stage. Furthermore, the piezoresistive behavior of MSCs was stable and repeatable during increasing loading cycles.

The signal-to-noise ratios and gauge factors under elastic tension are shown in Table 2. Note that the gauge factors and signal-to-noise ratios were determined for each loading cycle of each specimen, with three repeat specimens in total for each mixture design; the mean and standard deviation were then calculated based values determined from all loading cycles of all three repeat specimens for each mix design. It was observed that higher CB nanoparticles content increased the signal-to-noise ratio. This showed that dispersing CB nanoparticles throughout the cementitious matrix reduced the electrical heterogeneity of the material microstructure, increased both the partially conductive paths and the conductive paths, and decreased the bulk impedance and AC. The results also revealed that increasing CB content from 2.5% and 5% increased the material gauge factor from 52±19 to 247±24. However, further increasing CB content from 5% to 10% decreased the gauge factor to 105±12, due to the reduced amount of partially conductive paths. Apparently, these conditions were optimally satisfied in MSC-5% CB. The optimal range of CB nanoparticles to achieve the largest gauge factor (Table 2 and FIG. 14) at macro-scale is consistent with the findings at micro-scale from analyzing the electrical parameters (FIGS. 4A-4D) of the material microstructure.

FIG. 15 shows the electromechanical behavior of MSCs under cyclic uniaxial compression within material elastic stage, in comparison with the control SHC-0% CB. Similar to the cyclic tensile testing results, SHC-0% CB failed to show a clear trend of $Z_f$ change with respect to compressive strain. The large noise contained in the data indicated a low signal-to-noise ratio, which resulted from the highly heterogeneous electrical microstructure of SHC-0% CB. In contrast, SHC-2.5% CB, SHC-5% CB and SHC-10% CB all exhibited strong piezoresistive behavior under cyclic compression. The impedance magnitude decreased with increasing compressive strain, and increased with decreasing compressive strain, in a nearly linear manner. The gauge factors and signal-to-noise ratios were determined for each compressive loading cycle of each specimen, with three repeat specimens (one representative repeat is shown in FIG. 15) in total for each mixture design; the mean and standard deviation were then calculated based values determined from all loading cycles of all three repeat specimens for each mix design. As shown in Table 2, MSC-5% CB had the largest gauge factor (344±31) under compression, followed by the MSC-10% CB (236±19) and the MSC-2.5% CB (84±12). The trend was consistent with the impact of CB nanoparticles content on the tensile gauge factors. This further supported the material design approach that a strongly coupled electromechanical behavior under AC with a high signal-to-noise ratio can be achieved by tailoring the electrical parameters (i.e., $R_1$, $R_2$, $C_2$ and $C_1$) of the cementitious material by incorporating CB nanoparticles at an optimum content range. The strong, low-noise and stable electromechanical behavior of MSCs during increasing load cycles demonstrated their robust self-sensing capacity under both tension and compression.

Electromechanical Behavior Under Monotonic Tension Up to Failure

FIGS. 16A-16D show the electromechanical behavior of MSCs in comparison with the control SHC-0% CB under monotonic uniaxial tension up to failure. The fractional change in impedance magnitude ($Z_f$), impedance real ($Z_{rf}$) and imaginary ($Z_{mf}$) parts, and tensile stress were plotted against tensile strain. The tensile stress-strain relations of all the four materials contained three characteristic stages: (1) initial elastic stage; (2) tensile strain-hardening stage, which started when the first microcrack occurred, followed by a sequential formation of more and more steady-state microcracks with self-controlled width under 65 μm, and ended when localized fracture occurred at one of the microcracks. During this multiple micro-cracking stage, the tensile stress continued to increase with increasing tensile strain, thus termed "pseudo-strain-hardening" or "strain-hardening". This stage contributed to the large tensile ductility and damage tolerance of the materials; (3) tension-softening stage when the tensile stress continuously dropped accompanied with increasing opening of the localized crack.

Evidently, the multiple microcracking process during the strain-hardening stage, and the localized single crack opening during the tension-softening stage, strongly affected the electrical response of MSC materials. For the control SHC-0% CB, the impedance magnitude, and real and imaginary parts all increased with increasing tensile strain during the strain-hardening and tensile-softening stages, despite their unclear trend during the elastic stage. The data, however, contained significant noise. It is noticed that the fractional increase in the imaginary part of impedance was much larger than in the real part and the magnitude of impedance. Because of the strong capacitor effect of the cracks, the fractional change of imaginary part of impedance increased at a much higher rate than that of the real part during both strain-hardening and tension-softening stages (FIGS. 16A-16D).

Note that for SHC-0% CB, it is impossible to distinguish the tension-softening stage from the strain-hardening stage based on the increasing rate of fractional change in impedance. This phenomenon implied the dominating capacitor effect and the weak resistor effect of the cracks in SHC-0% CB. Because the conductivity of the substances (e.g. PVA fibers, air) between the crack walls was very low, each crack can be approximated as an ideal capacitor. When $R_{c,i}$ has an extremely high value, the material impedance change due to cracking becomes linearly proportional to the crack opening di. It thus can be mathematically proven that the same level of applied tensile deformation would induce the same change in the sum of openings of the multiple microcracks during the strain-hardening stage as in the single crack opening during the tension-softening stage, leading to the same rate of change in impedance.

For the MSCs, the magnitude, real part, and imaginary part of impedance all increased with increasing tensile strain during both the strain-hardening and tension-softening stages. However, compared with SHC-0% CB, MSCs had fundamentally different electromechanical behavior: (1) the data contained significantly low noise, indicating a reduced heterogeneity of material electrical microstructure and less impedance under AC; (2) the impedance increase was non-linear, implying that the cracks in MSCs cannot be approximated as ideal capacitors; (3) the tension-softening stage was clearly distinguishable from the strain-hardening stage, based on the obvious change in the increasing rate of impedance change with respect to strain. These differences resulted from the modified electrical parameters of fiber/matrix interfaces in MSCs. The CB nanoparticles surrounding the PVA fiber surfaces provided additional conductive paths through the fibers across each crack. Therefore, the crack resistor effect became significantly stronger in the MSCs than in SHC-0% CB. The combined resistor $R_{c,i}$ and capacitor $C_{c,i}$ effects of each microcrack led to the nonlinear increase in electrical impedance during the multiple microcracking process (i.e., the strain-hardening stage). When the MSCs entered the tension-softening stage, sequential multiple micro-cracking ended and localization of the final failure crack occurred. The propagation of the failure crack transited from steady-state cracking into Griffith-type cracking. This led to a rapid loss of fibers bridging the failure crack due to fiber rupture or complete pullout. Consequently, the resistance of the failure crack $R_{c,j}$ rapidly increased, and the capacitor effect of the failure crack $C_{c,j}$ regained its dominance, similar as in SHC-0% CB. This was reflected in FIG. 16 as the obvious increase of slope in the electrical impedance change, delineating the transition from the strain-hardening stage to the tension-softening stage. At the later stage of tension-softening, the impedance change resumed a nearly linear relation with respect to deformation, because the failure crack was approaching a traction-free crack, for which the capacitor effect governed.

Electromechanical Behavior Under Cyclic Tension Reaching Inelastic Stage

FIG. 17 shows electromechanical behavior of MSCs in comparison with SHC-0% CB under cyclic tension with increasing peak strain from 0.1% to 0.3% and 0.5% for every five loading cycles. The applied peak strains reached material inelastic (i.e., strain-hardening) stage where different levels of multiple microcracking had occurred. For SHC-0% CB, no clear correlation was observed between the impedance fractional change and tensile strain during each loading and unloading cycle, indicating a lack of self-sensing capability. In this study, the SHC-0% CB specimens were not under a wet or water-saturated condition; instead, the specimens were stored under natural outdoor conditions. Therefore, the low signal-to-noise ratio of SHC-0% CB, resulting from its highly heterogeneous electrical microstructure, overwhelmed the weak correlation (if any) between its electrical and mechanical responses.

In contrast, the MSCs were capable of self-sensing under cyclic loading. With little noise, the material impedance magnitude increased with increasing tensile strain, and decreased with decreasing tensile strain. The nearly linear correlation between impedance magnitude and strain remained consistent even if the loading cycles or peak strains increased. Such consistency and repeatability in MSC electromechanical response under cyclic loading is critical for achieving robust self-sensing. It was further observed that when the tensile strain decreased to zero during each cycle, the impedance magnitudes of MSC-5% CB and MSC-10% CB nearly returned to their original bulk impedance magnitudes. This impedance reversibility was also observed in MSC-2.5% CB during loading to the maximum strains of 0.1% and 0.3%. However, during loading to the maximum strain of 0.5%, residual impedance magnitude existed when the tensile strain was reduced to 0, and residual impedance increased after each loading cycle. The phenomenon was because at the 0.5% maximum tensile strain level, the MSC materials had entered the strain-hardening stage during which a significant number of microcracks had formed. These microcracks added more heterogeneity to the electrical microstructure of the MSCs. Each microcrack created a new phase (i.e., a new electrical interface) in the material system. Despite the physical closure of the microcracks when the tensile strain decreased to zero, the electrical interfaces still existed. These electrical interfaces exhibited contact impedance under AC excitation, resulting in the residual impedance of the material system. This mechanism was prominent when the content of CB nanoparticles was low, such as in MSC-2.5% CB. However, when a multitude of CB nanoparticles are present at the walls of the closed cracks, such as in MSC-5% CB and MSC-10% CB, the tunneling effect of the CB nanoparticles diminished the contact impedance, which minimized residual impedance. Evidently, the multiple microcracking process during the strain-hardening stage, and the localized single crack opening during the tension-softening stage, strongly affected the electrical response of MSC materials. For the control SHC-0% CB, the impedance magnitude, and real and imaginary parts all increased with increasing tensile strain during the strain-hardening and tensile-softening stages, despite their unclear trend during the elastic stage.

ADDITIONAL EXAMPLES

Figure 12A:
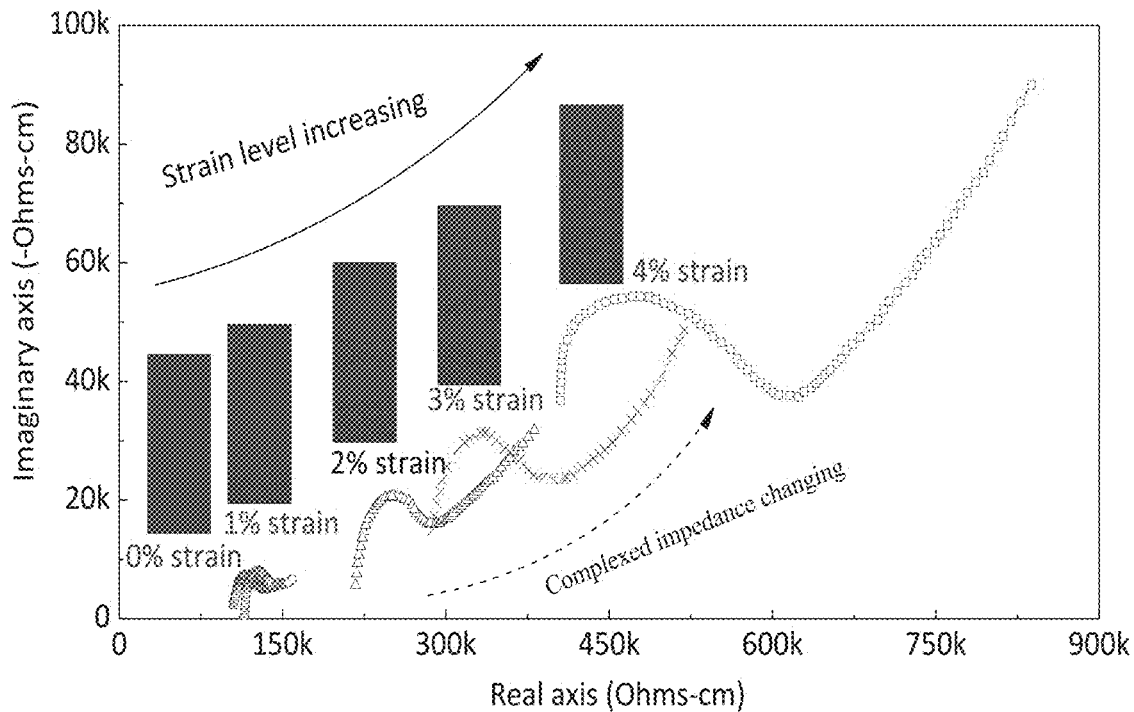
FIG. 12A shows a non-limiting example of the effect of material damage process on the complex impedance due to multiple microcracking during strain-hardening.
Figure 12B:
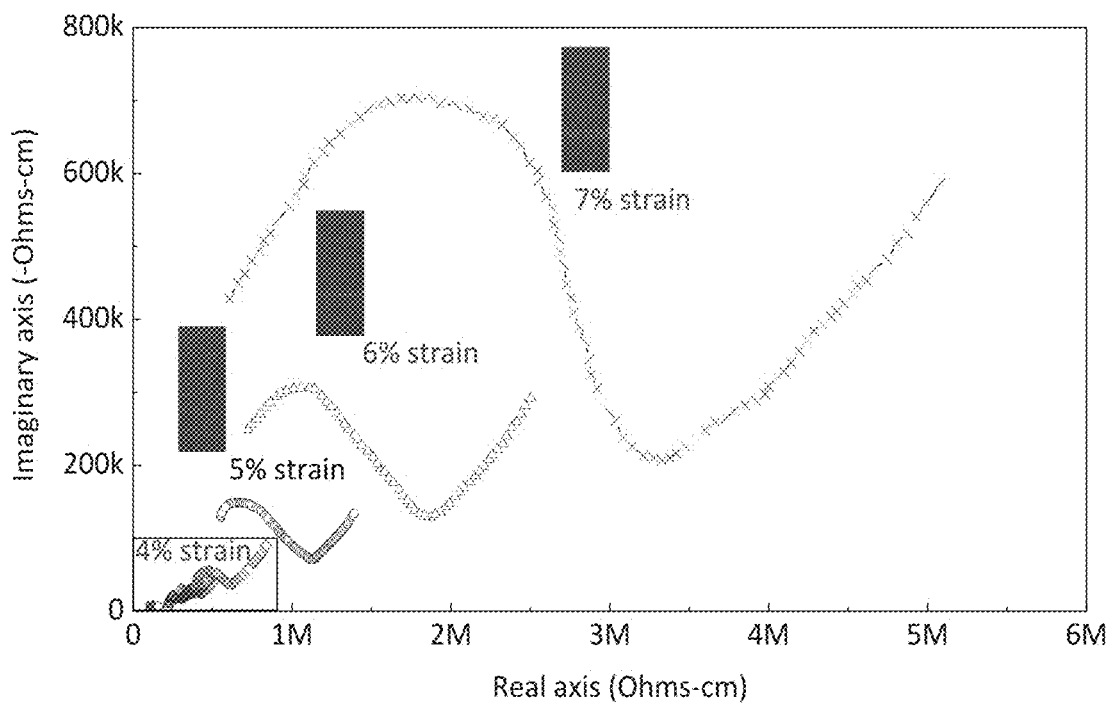
FIG. 12B shows the effect of material damage process on the complex impedance due to localized fracture during tension-softening.

Impedance spectroscopy at frequencies of 1 HZ to 1 MHZ were conducted on a non-limiting example of MSC at different damage levels under tension, in order to demonstrate the effect of microcracking damage on the complex impedance of self-sensing MSC. The data for 5% MSC is shown in FIGS. 12A-12B. Eight damage levels were considered, corresponding to 0%, 1%, 2%, 3%, 4%, 5%, 6%, and 7% applied tensile strain. It should be noted that an applied tensile strain level larger than 1% was considered to be very high in cementitious materials; large cracking and concrete material failure is inevitable at such high tensile strain levels, and the structure relies on steel reinforcement to prevent failure.

Due to the large tensile strain capacity of MSCs, the cementitious material itself can resist extraordinarily large applied tensile strains without failure; instead, the damage level within MSCs increased in form of multiple steady-state microcracking with self-controlled crack width to micrometer scale. The change in damage level in MSCs can also be self-sensed through complex measured data of complex impedance, as shown in the Nyquist plot in FIGS. 12A-12B. With increasing strain level, the increased multiple cracking damage within MSC specimens were shown. It was obvious that increasing microcracking damage level in MSC increased the radius of the high-frequency arc of the Nyquist plot and shifted the center of the arc to the right. The results clearly showed that the damage level in MSC, including the increased multiple microcracking process during strain-hardening stage and the localized fracture failure that initiates the tension-softening stage, can be successfully self-sensed MSC.

Non-limiting examples of MSC compositions and mechanical properties are displayed in Table 1. Non-limiting examples of MSC gauge factors and signal-to-noise ratios during elastic stage are displayed in Table 2. Material properties are displayed in Table 1. In some embodiments, the materials can be processed with a laboratory concrete mixer. FIGS. 13A-13C shows non-limiting examples of structural components prepared from the present invention.

TABLE 1

Non-limiting examples of composition design of SHC-CB material (initial design) and MSC material (redesign).

| Material | Water kg/m³ | Cement kg/m³ | Sand kg/m³ | Fly ash kg/m³ | Carbon black kg/m³ | Super-plasticizer kg/m³ | Fiber Vol. % | Silica fume kg/m³ | Water-binder ratio | Compre. strength MPa | Tensile strength MPa | Strain capacity % |
|---|---|---|---|---|---|---|---|---|---|---|---|---|
| Initial design | | | | | | | | | | | | |
| SHC-0% CB | 312 | 292 | 456 | 935 | 0 | 2.7 | 2.00 | 0 | 0.25 | 44.6 ± 3.8 | 4.54 ± 0.20 | 5.41 ± 0.30 |
| SHC-2.5% CB | 312 | 285 | 445 | 912 | 12.5 | 2.7 | 1.93 | 0 | 0.26 | 36.6 ± 3.4 | 3.83 ± 0.18 | 1.82 ± 0.12 |
| SHC-5% CB | 314 | 277 | 433 | 888 | 25 | 2.7 | 1.84 | 0 | 0.27 | 32.5 ± 3.1 | 3.04 ± 0.23 | 1.97 ± 0.29 |
| SHC-10% CB | 330 | 263 | 410 | 842 | 51 | 2.7 | 1.67 | 0 | 0.30 | 30.2 ± 2.8 | 2.11 ± 0.17 | 1.40 ± 0.11 |
| Redesign | | | | | | | | | | | | |
| MSC-2.5% CB | 277 | 243 | 380 | 584 | 12.5 | 2.7 | 1.94 | 113 | 0.33 | 42.1 ± 3.7 | 4.43 ± 0.43 | 5.24 ± 0.26 |
| MSC-5% CB | 296 | 243 | 380 | 600 | 25 | 3.5 | 1.83 | 115 | 0.35 | 40.3 ± 3.4 | 3.76 ± 0.10 | 4.30 ± 0.27 |
| MSC-10% CB | 313 | 243 | 380 | 611 | 51 | 4.0 | 1.65 | 117 | 0.37 | 38.2 ± 3.1 | 2.78 ± 0.07 | 3.03 ± 0.12 |

TABLE 2

Non-limiting examples of gauge factors and signal-to-noise ratios during material elastic stage. The cementitious material of the present invention (MSCs) increases the signal-to-noise ratio of the electrical response signal compared with control SHC-0% CB.

| | | SHC-0% CB | MSC-2.5% CB | MSC-5% CB | MSC-10% CB |
|---|---|---|---|---|---|
| Gauge factor | Tension | N/A | 52 ± 19 | 247 ± 24 | 105 ± 12 |
| | Compression | N/A | 84 ± 12 | 344 ± 31 | 236 ± 19 |
| Signal-to-noise ratio (db) | Tension | N/A | 6.13 ± 2.4 | 19.4 ± 2.0 | 19.7 ± 1.7 |
| | Compression | N/A | 13.6 ± 1.9 | 18.7 ± 1.2 | 18.9 ± 1.6 |

As used herein, the term "about" refers to plus or minus 30% or less, e.g., 10%, of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A multi-functional cementitious material comprising:
   a. water;
   b. cement;
   c. aggregates, wherein the aggregates are fine sand or ground quartz;
   d. pozzolanic ingredients at a level of about 0-70% wt of the multi-functional cementitious material;
   e. conductive nanoparticulates at a level of about 0.1-30% vol of the multi-functional cementitious material;
   f. superplasticizer, or/and accelerator, or/and retarder, or/and viscosity modifying agent; and
   g. discontinuous reinforcing fibers, wherein the discontinuous reinforcing fibers are polyvinyl alcohol (PVA) fibers, polyethylene fibers, polypropylene fibers, basalt fibers, or combinations thereof,
   wherein the cement, aggregates, and pozzolanic materials are mixed to provide a uniform dry mixture,
   wherein the water and superplasticizer, or/and accelerator, or/and retarder, or/and viscosity modifying agent are mixed with the dry mixture to form a cementitious paste having a rheology favorable for even dispersion of reinforcing fibers and conductive nanoparticulates,
   wherein the conductive nanoparticulates and the reinforcing fibers are mixed with the cementitious paste to produce the multi-functional cementitious material;
   wherein the multi-functional cementitious material has a tailored network of micro to nano-sized pores, aggregates/matrix interfaces, and fiber/matrix interfaces that exhibits a cracking behavior capable of dissipating energy through multiple microcracking with self-controlled microcrack widths of about 10 μm to 100 μm during strain-hardening stage such that the cementitious material is ductile and damage-tolerant, and
   wherein the multi-scale structure and network of partially conductive, conductive, and non-conductive paths in the cementitious material also enable the material to behave as an electrical piezoresistive self-sensor under multi-frequency AC probing for measurement and monitoring of its mechanical and deterioration state.

2. A multi-functional cementitious material comprising:
   a. water at a level of about 3-30% wt of the multi-functional cementitious material;
   b. cement at a level of about 10-50% wt of the multi-functional cementitious material;
   c. aggregates at a level of about 0-60% wt of the multi-functional cementitious material;
   d. pozzolanic ingredients at a level of about 0-65% wt of the multi-functional cementitious material,
   e. conductive nanoparticulates at a level of about 0.1-30% vol of the multi-functional cementitious material, wherein the conductive nanoparticulates have a particle size ranging from about 1 nm to 1 μm;

f. a plasticizer at a level of about 0.01-1% wt of the multi-functional cementitious material, wherein the plasticizer is a polycarboxylate-based concrete super-plasticizer;

g. an accelerator, retarder, viscosity modifying agent, or combinations thereof, are added to adjust rheology and setting time; and h. reinforcing fibers at a level of about 0.1-8% vol of the multi-functional cementitious material, wherein the reinforcing fibers are polyvinyl alcohol (PVA) fibers, polyethylene fibers, polypropylene fibers, basalt fibers, or combinations thereof and wherein the reinforcing fibers have a length ranging from about 1 mm to 100 mm, and a fiber diameter ranging from about 1 μm to 500 μm, wherein the cement, aggregates, and pozzolanic materials are mixed to provide a uniform dry mixture, wherein the water, plasticizer, and accelerator, retarder, or viscosity modifying agent, are mixed with the dry mixture to form a cementitious paste having a rheology favorable for even dispersion of reinforcing fibers and conductive nanoparticulates, wherein the conductive nanoparticulates and the reinforcing fibers are mixed with the cementitious paste to produce the multi-functional cementitious material;

wherein the multi-functional cementitious material comprises a tailored network of micro- to nano-sized phases and interfaces that exhibits a straining and cracking behavior capable of dissipating energy through sequentially formed multiple microcracks with controlled crack widths of about 10 μm to 100 μm during strain-hardening stage such that the cementitious material is ductile and damage-tolerant, and wherein the multi-scale structure and interfaces of the cementitious material enables electromechanical behaviour such that the cementitious material behaves as a self-sensing material to detect and quantify its own mechanically-, chemically-, or environmentally-induced strain, damage, or deterioration with spatially continuous resolution wherever the multi-functional cementitious material is located in a structure, through alternating current (AC) or direct current (DC) electrical probing.

3. The multi-functional cementitious material of claim 1, wherein the mechanical state being measured and monitored is strain, displacement, damage, cracking, chloride penetration, or deterioration that are mechanically, chemically, or environmentally induced.

* * * * *